United States Patent
Tsai

(10) Patent No.: US 10,349,324 B2
(45) Date of Patent: Jul. 9, 2019

(54) USER EQUIPMENT, ACCESS NODE AND SLICE-BASED HANDOVER METHOD THEREOF

(71) Applicant: Industrial Technology Research Institute, Hsinchu (TW)

(72) Inventor: Tzu-Jane Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 9 days.

(21) Appl. No.: 15/730,765

(22) Filed: Oct. 12, 2017

(65) Prior Publication Data

US 2018/0124661 A1    May 3, 2018

Related U.S. Application Data

(60) Provisional application No. 62/416,716, filed on Nov. 3, 2016.

(51) Int. Cl.
*H04W 24/10* (2009.01)
*H04W 36/06* (2009.01)
*H04W 36/00* (2009.01)

(52) U.S. Cl.
CPC .......... *H04W 36/06* (2013.01); *H04W 24/10* (2013.01); *H04W 36/0011* (2013.01); *H04W 36/00835* (2018.08); *H04W 36/0085* (2018.08)

(58) Field of Classification Search
CPC ........... H04W 36/06; H04W 36/00835; H04W 36/0011; H04W 36/0085; H04W 24/10
See application file for complete search history.

(56) References Cited

U.S. PATENT DOCUMENTS

| 8,364,150 B2 | 1/2013 | Huet et al. |
| 9,462,477 B2 | 10/2016 | Ahmad et al. |
| 2010/0317352 A1* | 12/2010 | Nakata ............... H04W 48/18 455/445 |

(Continued)

FOREIGN PATENT DOCUMENTS

| CN | 106210042 | 12/2016 |
| TW | 201715910 | 5/2017 |

(Continued)

OTHER PUBLICATIONS

Samsung,"RAN Design Issues for Supporting Slicing", 3GPP TSG-RAN WG2 Meeting #95,R2-165277, Aug. 22-26, 2016,pp. 1-6.

(Continued)

*Primary Examiner* — Curtis A Alia
(74) *Attorney, Agent, or Firm* — JCIPRNET

(57) ABSTRACT

Embodiments of a user equipment (UE), an access node and a slice-based handover method are provided. In an embodiment of the method, a service request is sent from a UE to an access node. Multiple candidate slice instances provided by cells of the access node and its neighbor nodes that support the service request are then selected. Various measurement objects with respect to each candidate slice instance are measured and a measurement report is sent to the access node by the UE. A target cell with at least one slice instance that supports the service request is decided from the candidate slice instances according to the measurement report. Finally, a control command is sent to the UE by the access node to configure a connection between the UE and the target cell.

40 Claims, 22 Drawing Sheets

(56) References Cited

U.S. PATENT DOCUMENTS

| | | | |
|---|---|---|---|
| 2013/0223272 A1* | 8/2013 | Tao | H04B 7/024 370/252 |
| 2016/0249353 A1 | 8/2016 | Nakata et al. | |
| 2017/0064031 A1 | 3/2017 | Sunay | |
| 2017/0070892 A1 | 3/2017 | Song et al. | |
| 2017/0079059 A1 | 3/2017 | Li et al. | |
| 2017/0086118 A1 | 3/2017 | Vrzic | |
| 2017/0367036 A1* | 12/2017 | Chen | H04W 76/10 |

FOREIGN PATENT DOCUMENTS

| | | |
|---|---|---|
| WO | 2014168225 | 10/2014 |
| WO | 2016053426 | 4/2016 |
| WO | 2017044151 | 3/2017 |

OTHER PUBLICATIONS

Huawei et al.,"RAN Support of Network Slice Discovery", 3GPP TSG-RAN WG2 Meeting #95bis,R2-166208,Oct. 10-14, 2016, pp. 1-2.

Huawei et al.,"Key Principles for Support of Network Slicing in RAN", 3GPP TSG-RAN WG2 Meeting #95bis, R2-166206, Oct. 10-14, 2016,pp. 1-3.

CATT, "Consideration on RAN slicing support", 3GPP TSG RAN WG2 Meeting #95bis, R2-166126, Oct. 10-14, 2016,pp. 1-5.

Samsung,"E2E network slice: concept and requirements from RAN perspective", 3GPP TSG-RAN WG2 95, R2-165282, Aug. 22-26, 2016,pp. 1-4.

Online Drafting, "Interim Agreements on network slicing", SA WG2 Meeting #115, S2-163162, May 23-27, 2016,pp. 1.

Office Action of Taiwan Counterpart Application, dated Oct. 15, 2018, pp. 1-13.

T Shimojo, "Future Core Network for the 5G Era," NTT DOCOMO Technical Journal vol. 17 No. 4, Apr. 2016, pp. 50-59.

3GPP TR 28.201, "3rd Generation Partnership Project; Technical Specification Group Services and System Aspects; Telecommunication management; Study on management and orchestration of network slicing for next generation network (Release 14)," V.0.2.0, Sep. 2016, pp. 1-20.

* cited by examiner

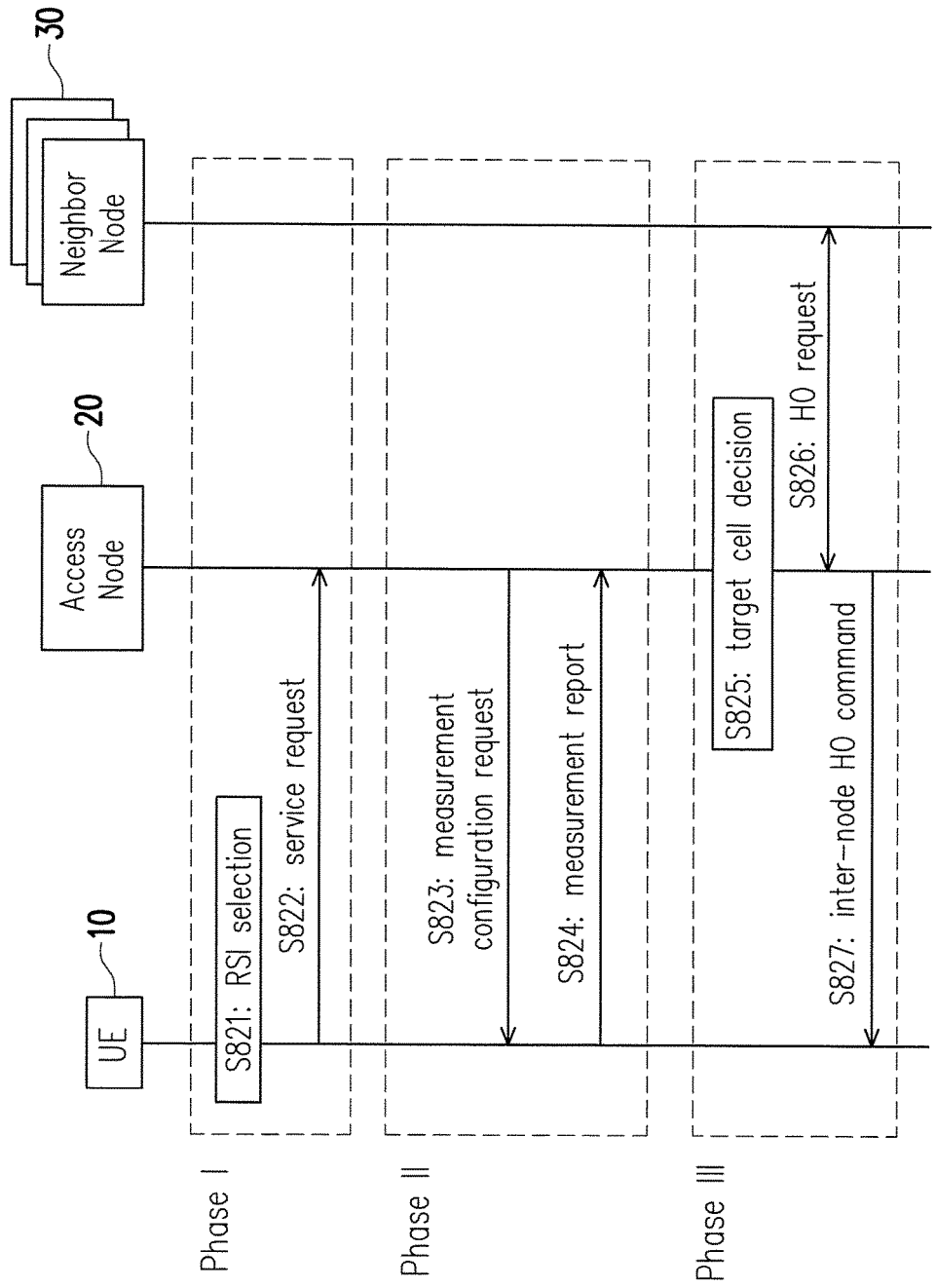

USER EQUIPMENT, ACCESS NODE AND SLICE-BASED HANDOVER METHOD THEREOF

CROSS-REFERENCE TO RELATED APPLICATION

This application claims the priority benefit of U.S. provisional application Ser. No. 62/416,716, filed on Nov. 3, 2016. The entirety of the above-mentioned patent application is hereby incorporated by reference herein and made a part of this specification.

TECHNICAL FIELD

The application relates to a user equipment, an access node and a slice-based handover method thereof.

BACKGROUND

In recent trend, in order to support diverse service requirement for 5G, network slicing is a must solution. The following definition of network slice had reached an agreement: "A Network slice is an end-to-end (E2E) concept including core network (CN) slice parts and radio access network (RAN) slice parts. The RAN part of the slice routes signalling to the CN part of the Slice." Regarding the network slicing scenario, there was an interim agreement: "A user equipment (UE) may access multiple slices simultaneously via a single RAN." Regarding the RAN slice parts, a definition was proposed: "The combination of L1 resource component and L2 configuration/functions, to address the needs of different services and requirements, can be defined as RAN Slice."

Long term evolution (LTE) (i.e. 4G) is a homogeneous network, and each node is assumed with the same capability. 5G, however, is assumed as a multi-tier network, which means each node is with different (or limited) RAN-slice capability. Therefore, a problem that additional handover caused by potential services in multiple-slices scenario may arise.

SUMMARY

The application provides a slice-based handover method. The method includes following steps: sending a service request from a UE to an access node; selecting a plurality of candidate slice instances provided by a plurality of cells of the access node and a plurality of neighbor nodes that support the service request; measuring a plurality of measurement objects with respect to each candidate slice instance and sending a measurement report to the access node by the UE; deciding a target cell with at least one slice instance that supports the service request from the candidate slice instances according to the measurement report by the access node; and sending a control command to the UE to configure a connection between the UE and the target cell by the access node.

The application provides a slice-based handover method adapted to an access node. The method includes following steps: receiving a service request from a UE; selecting a plurality of candidate slice instances provided by a plurality of cells of the access node and a plurality of neighbor nodes that support the service request; transmitting a measurement configuration request comprising a plurality of measurement objects to be measured with respect to each candidate slice instance determined according to an application service type indicated in the service request to the UE; receiving a measurement report from the UE, wherein the measurement report is generated by the UE measuring the plurality of measurement objects with respect to each candidate slice instance; deciding a target cell with at least one slice instance that supports the service request from the candidate slice instances according to the measurement report; and sending a control command to the UE to configure a connection between the UE and the target cell.

The application provides an access node including a plurality of cells, a communication interface, and a processor. Each of the plurality of cells provides at least one slice instance. The communication interface is configured to communicate with a plurality of neighbor nodes. The processor is coupled to the cells and the communication interface and configured to execute instructions to receive a service request from a user equipment (UE), select a plurality of candidate slice instances from the slice instances provided by the plurality of cells of the access node and the plurality of neighbor nodes that support the service request, transmit a measurement configuration request comprising a plurality of measurement objects to be measured with respect to each of the candidate slice instances determined according to an application service type indicated in the service request to the UE, receive a measurement report from the UE, wherein the measurement report is generated by the UE measuring the plurality of measurement objects with respect to each of the candidate slice instances, decide a target cell with at least one slice instance that supports the service request from the candidate slice instances according to the measurement report, and send a control command to the UE to configure a connection between the UE and the target cell.

The application provides a slice-based handover method adapted to an UE. The method includes following steps: sending a service request to an access node; receiving a measurement configuration request comprising a plurality of measurement objects to be measured with respect to each of a plurality of candidate slice instances determined according to an application service type indicated in the service request to the UE; measuring a plurality of measurement objects with respect to each candidate slice instance and sending a measurement report to the access node; and receiving a control command from the access node to configure a connection between the UE and the target cell decided by the access node from the candidate slice instances according to the measurement report, wherein the target cell comprises at least one slice instance that supports the service request.

The application provides a user equipment including a transceiver and a processor. The transceiver is configured to communicate with a plurality of cells disposed in an access node. The processor is coupled to the transceiver and configured to execute instructions to send a service request to the access node, receive a measurement configuration request comprising a plurality of measurement objects to be measured with respect to each of a plurality of candidate slice instances determined according to an application service type indicated in the service request, measure a plurality of measurement objects with respect to each of the candidate slice instances and send a measurement report to the access node, and receive a control command from the access node to configure a connection between the UE and a target cell decided by the access node from the candidate slice instances according to the measurement report, wherein the target cell comprises at least one slice instance that supports the service request.

Several exemplary embodiments accompanied with figures are described in detail below to further describe the application in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8A to FIG. 8D are schematic diagrams illustrating a slice-based handover method according to an embodiment of the application.

DESCRIPTION OF EMBODIMENTS

In the present application, exemplary embodiments of a radio access network (RAN) slice instance (RSI) selection are provided to alleviate additional handover. When an RSI selection is needed for a service request from a user equipment (UE), a node which not only supports the RSI for the current service, but also supports the RSI capability of UE as much as possible for the potential services is selected. The exemplary embodiments are provided to RSI selection which alleviates the additional handover caused by potential services in multiple-slices scenario.

Figure 1:
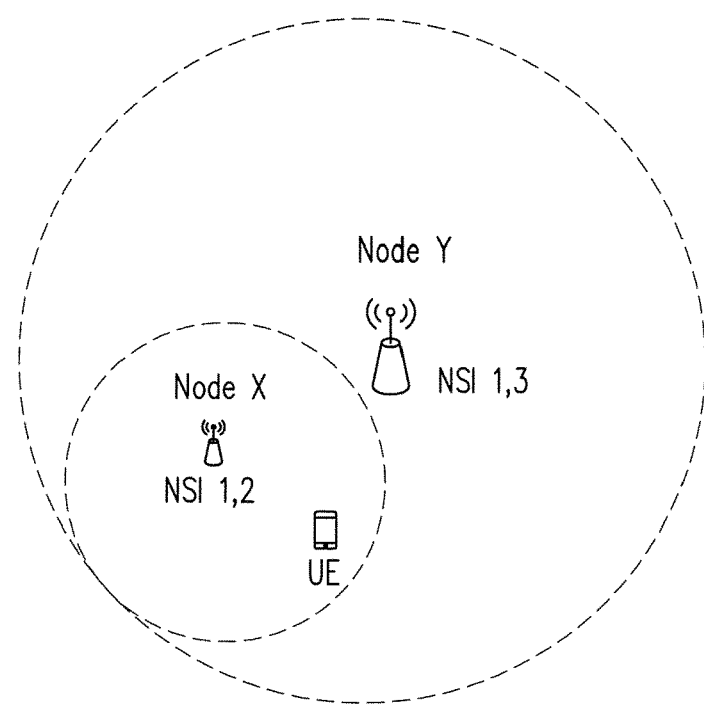
FIG. 1 is a schematic diagram of slice instance selection according to an embodiment of the application.

For example, FIG. 1 is a schematic diagram of slice instance selection according to an embodiment of the application. Referring to FIG. 1, when an UE enters signal ranges of a Node X and a Node Y, in which the Node X provides network slice instance (NSI) 1 and 2 while the Node Y provides NSI 1 and NSI 3. Basically, if a current service request of the UE requires support of the NSI 1, either the Node X or the Node Y which provides the NSI 1 can be selected for supporting the current service. However, if a potential service of the UE requires support of the NSI 3, the Node Y which further provides the NSI 3 is selected for supporting the potential service. As a result, possible handover from the Node X to the Node Y caused by the potential service of the UE can be alleviated by first selecting the Node Y to serve the service request of the UE.

Regarding the RSI, there is a mapping relationship between the NSI and the RSI. In one embodiment, the RSI is a pre-defined set of L1 and L2, like a codebook. In another embodiment, the RSI is a pre-configured set of L1 and L2 (for example, like a package, and RAN-operator specific). The parameters of L1 may include radio and physical components such as subcarrier spacing, reference signal (RS) offset, cyclic prefix (CP) length, time alignment, frame structures, and antenna, and the possible parameters of L2 may include configurations/functions such as TB size, logical channel prioritization (LCP), acknowledge mode (AM)/unacknowledged mode (UM), segmentation/concatenation, and ciphering.

Table 1 listed below is an example of an RSI index table.

TABLE 1

| RSI ID | frequency | Subcarrier spacing (kHz) | RS offset | CP | Antenna | TB size | LCP | AM/UM | Segmentation/Concatenation | Ciphering |
|---|---|---|---|---|---|---|---|---|---|---|
| 1 | 60 GHz | 60 | 0 | ECP | 8 | L | H | AM | Y | N |
| 2 | 28 GHz | 30 | 1 | NCP | 4 | L | M | UM | Y | N |
| 3 | 5 GHz | 30 | 2 | ECP | 8 | M | H | AM | Y | Y |
| 4 | 2.4 GHz | 15 | 3 | NCP | 4 | M | H | AM | N | Y |
| 5 | 900 MHz | 7.5 | 4 | NCP | 4 | S | L | UM | N | N |

RSI 1 to 5 are, for example, the network slices available in a given area and capable of being selected for supporting various services requested by a UE. For example, RSI 1 and 2 may be for eMBB services, RSI 3 and 4 may be for URLLC services, and RSI 5 may be for mIoT service.

Figure 2:
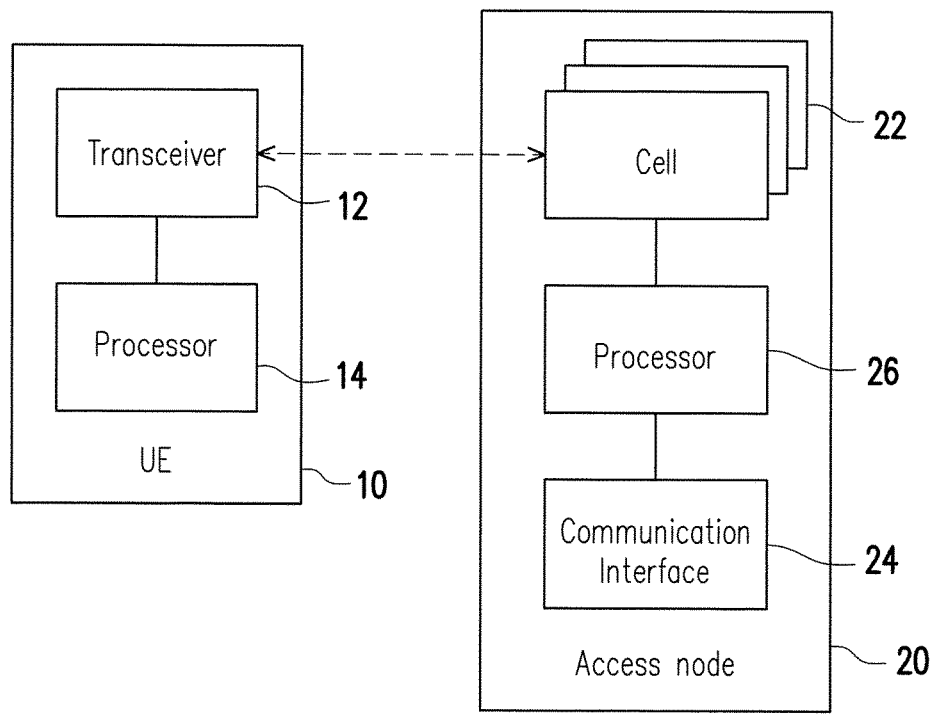
FIG. 2 is a block diagram illustrating structures of a UE and an access node according to an embodiment of the application.

FIG. 2 is a block diagram illustrating structures of a UE and an access node according to an embodiment of the application. Referring to FIG. 2, a UE 10 can be a stationary or mobile communication device supporting 5G new radio (NR) such as a mobile station, a server, a personal computer (PC), a tablet PC, a phone device, a personal digital assistant (PDA) and the like. The access node 20 can be a cellular network node such as next generation node B (gNodeB or gNB).

The UE 10 at least includes a transceiver 12 and a processor 14. The transceiver 12 is, for example, configured to transmit wireless signals to and receive wireless signals from the cells 22 in the access node 20. The processor 14 is, for example, a programmable calculation device, such as a microprocessor, a microcontroller, a central processing unit (CPU), a digital signal processor (DSP), a field programmable gate array (FPGA), an application-specific integrated circuit (ASIC) or the like, and is configured to control the operations of the user equipment 10.

The access node 20 includes a plurality of cells 22, a communication interface 24 and a processor 26 coupled to the cells 22 and the communication interface 24. The cells 22 refer to, for example, base stations and each of the cells 22 includes a transceiver capable of transmitting wireless signals to and receiving wireless signals from the transceiver 12 of the UE 10. In one embodiment, each of the cells may further include, but not limited to, an amplifier, a mixer, an oscillator, an analog-to-digital converter (ADC), a digital-to-analog converter (DAC), a filter or other hardware components so as to perform operations such as low noise amplifying, impedance matching, frequency mixing, frequency up-converting or down-converting, filtering and the like. The communication interface 24 is, for example, an Xn interface that allows to interconnect two gNBs or one gNB and one LTE eNB, and is configured to communicate with neighbor nodes of the access node 20. The processor 26 is, for example, a programmable calculation unit, such as a microprocessor, a microcontroller, a CPU, a DSP, a FPGA, an ASIC or the like, and is configured to control the operations of the access node 20.

Figure 3A:
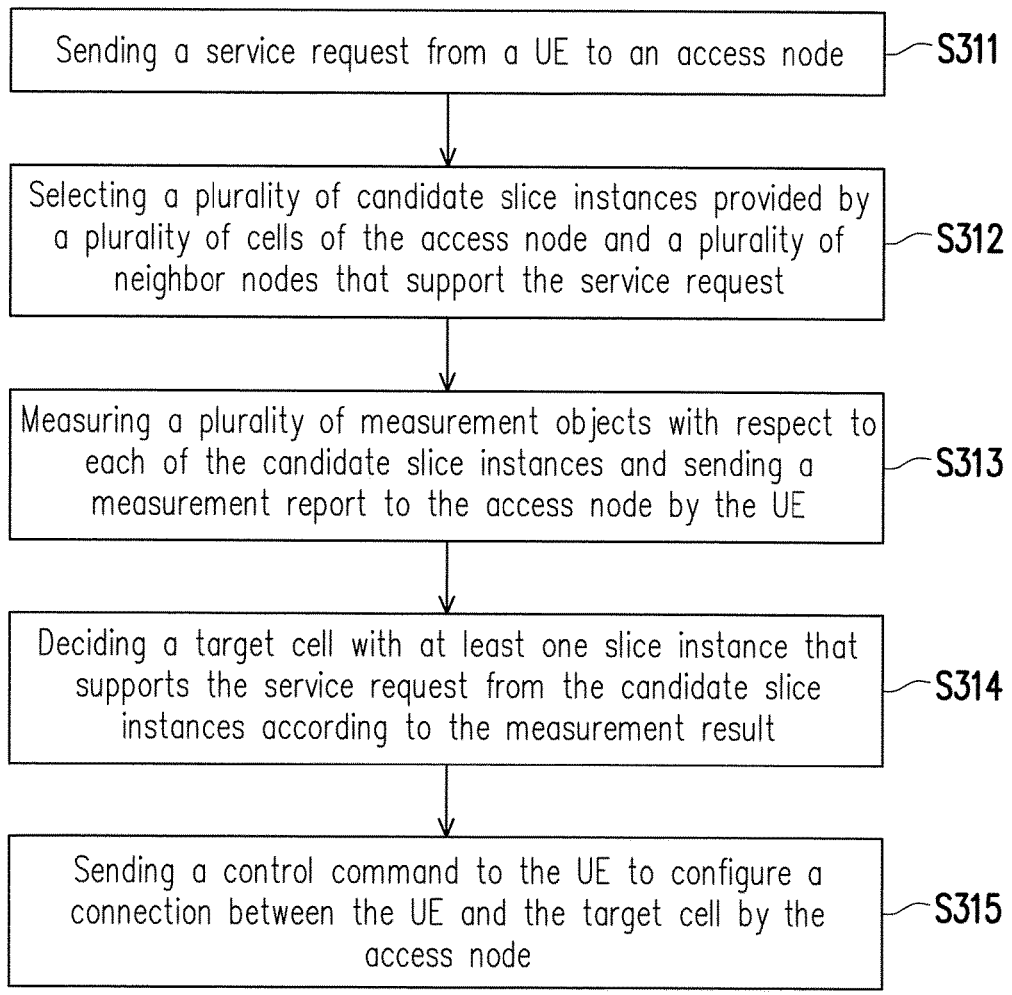
FIG. 3A and FIG. 3B are flowcharts illustrating a slice-based handover method according to an embodiment of the application.

FIG. 3A is a flowchart illustrating a slice-based handover method according to an embodiment of the application. Referring to FIG. 3A, the method of the present embodiment is adapted to the UE 10 and the access node 20 as described in aforementioned embodiment. Detailed steps of the method are described below with reference to various components in the UE 10 and the access node 20 of FIG. 2.

First, a service request is sent from the UE 10 to the access node 20 (step S311). The service request is sent, for example, in a form of radio resource control (RRC) message by the transceiver 12 of the UE 10. The service request may include information such as a service type, quality of service (QoS) parameters and slice selection information. In one embodiment, the slice selection information is provided as radio slice selection assistance information (RSSAI) that includes one or a combination of a RSI capability, a band capability, a frequency capability, a numerology capability, and an antenna capability of the UE 10. In another embodiment, the slice selection information is provided as RSSAI contained in the network slice selection assistance information (NSSAI) that is configured by the UE 10 to assist the access node 20 in selecting a next node for connection.

Next, a plurality of candidate slice instances provided by a plurality of cells of the access node 20 and a plurality of neighbor nodes that support the service request are selected (step S312). It is noted that each of the access node 20 and the plurality of neighbor nodes may include one or more cells, and each cell may provide one or more RSIs for selection, which is not limited herein. In the present application, the candidate slice instances are selected from a plurality of RSIs provided by the cells of the access node 20 and the neighbor nodes of the access node 20 by the access node 20 or by the UE 10 itself.

To be specific, in one embodiment, the candidate slice instances are selected by the access node 20 from a plurality of slice instances provided by the cells 22 of the access node 20 and the cells of the neighbor nodes according to slice instance information pre-defined or pre-configured to each of the slice instances.

In another embodiment, the candidate slice instances are selected by the UE 10 based on the slice instance information provided by the cells 22 of the access node 20. In detail, the UE 10 may receive, by using the transceiver 12, slice instance information pre-defined or pre-configured to each of the slice instances provided by the cells of the access node 20 and the neighbor nodes from a slice instance server (not shown) or from the access node 20, and then selects the candidate slice instances from these slice instances according to the received slice instance information.

Then, the UE 10 measures a plurality of measurement objects with respect to each candidate slice instance and sends a measurement report to the access node 20 (step S313). In detail, the UE 10 may receive a measurement configuration request from the access node 20, wherein the measurement configuration request comprises the measurement objects to be measured with respect to each candidate slice instance determined by the access node 20 according to an application service type such as enhance Mobile Broadband (eMBB), Ultra-Reliable Low Latency Communication (URLLC), or massive Internet of Things (mIoT) indicated in the service request. The measurement objects may include one or a combination of a frequency or a band, physical cell identifiers (PCIs), a reference signal receiving power (RSRP), and a reference signal receiving quality (RSRQ).

For example, Table 2 lists the measurement objects and measurement triggering events with respect to the application service types described above.

TABLE 2

| | Application service type | | |
|---|---|---|---|
| | eMBB | URLLC | mIoT |
| Measurement objects | High central freq., large measurement BW RSRP/RSRQ of NR-SS or CSI-RS | Central freq., measurement BW RSRP/RSRQ of NR-SS, CSI-RS BER/PER of one carrier/DRB | Low central freq., small measurement BW RSRP/RSRQ of NR-SS or CSI-RS |
| Measurement triggering event | Event A1: Serving quality becomes better than threshold. Event A2: Serving quality becomes worse than threshold. Event S1: Serving reliability becomes better than threshold. Event S2: Serving reliability worse than threshold. Cell quality is derived from averaging RSRP/RSRQ. Cell reliability is derived from statistical collection of error rate (percent), access delay (ms), scheduling delay (ms), etc. | | |

The service eMBB requires very high data rate and large bandwidths (BW), and therefore measurements for the wireless signals with high central frequency and large measurement BW such as RSRP/RSRQ of New Radio Technology Synchronization Signal (NR-SS) or Channel State Information Reference Signal (CSI-RS) are configured as the measurement objects. The service URLLC requires very low latency, very high reliability and availability, and therefore measurements for the wireless signals with a specific central frequency and measurement BW such as RSRP/RSRQ of NR-SS or CSI-RS, and bit error rate (BER)/packet error rate (PER) of one carrier/distributed resource block (DRB) are configured as the measurement objects. The service mIoT requires low BW, high connection density, enhanced coverage, and low energy consumption at the user end, and therefore measurements for the wireless signals with low central frequency and small measurement BW such as RSRP/RSRQ of NR-SS or CSI-RS are configured as the measurement objects.

In addition to the measurement objects, various measurement triggering events may also be configured to determine the variation of the wireless signals measured with respect to each candidate slice instance. For example, events A1, A2, S1, S2 respectively indicate the variation of the serving quality or the serving reliability, in which a cell quality may be derived from averaging the measured RSRP/RSRQ while a cell reliability may be derived from statistical collection of error rate (percent), access delay (ms), scheduling delay (ms), etc.

Back to the flow in FIG. 3A, after receiving the measurement report from the UE 10, the access node 20 decides a target cell with at least one slice instance that supports the service request from the candidate slice instances according to the measurement report (step S314). In detail, the access node 20 may establish a target cell priority list including a plurality of target cells sorted based on a number of the slice instances of each target cell that support the UE according to the measurement report and sequentially determines whether each of the target cells in the target cell priority list can support the service request.

Finally, the access node 20 sends a control command to the UE 10 to configure a connection between the UE 10 and the selected target cell (step S315). In detail, based on the decision in step S314, the access node 20 may direct the UE 10 to perform an intra-node handover or an inter-node handover, redirect the UE 10 to the selected target, or reject the service request of the UE 10.

Figure 3B:
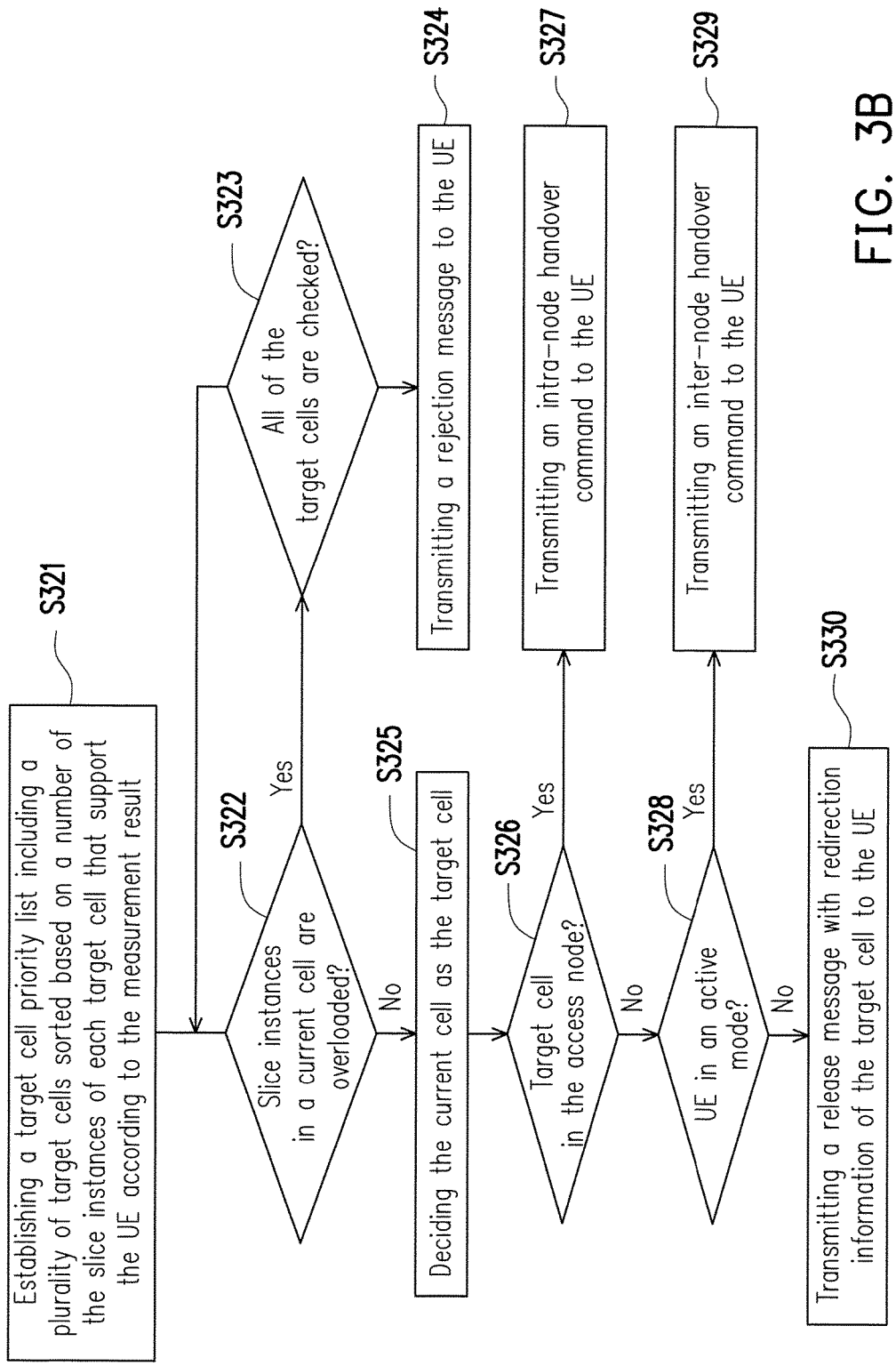

In detail, FIG. 3B is a flowchart illustrating a slice-based handover method according to an embodiment of the application. Referring to FIG. 3B, the present embodiment illustrates the detailed steps of the step S314 and S315 of FIG. 3A.

As for the decision in step S314, the access node 20 may establish a target cell priority list including a plurality of target cells sorted based on a number of the slice instances of each target cell that support the UE according to the measurement report (step S321). That is, after receiving the measurement report from the UE 10, the access node 20 may select the slice instances capable of supporting the service request of the UE 10 from the previously selected candidate slice instances, accumulate a number of slice instances for each target cell that support the UE, and finally sort the target cells according to the accumulated number of slice instances. As a result, the target cell sorted head may have higher RSI capability to support the UE 10.

It is noted, in the present embodiment, the access node 20 further periodically exchanges RSI information (i.e. a RSI capability and/or a RSI load information) with the neighbor nodes by using the communication interface 24 so as to determine whether the slice instances in a current cell of the target cells are overloaded based on the RSI load information.

To be specific, the access node 20 may determine whether the slice instances in a current cell of the target cells in the target cell priority list are overloaded based on the RSI load information (step S322).

If the slice instances in the current cell are overloaded, the access node 20 may determine whether all of the target cells in the target cell priority list are checked (step S323). If not, the access node 20 continues to try a next cell in the target cell priority list and returns to step S322 to determine whether the slice instances in the next cell of the target cells are overloaded based on the RSI load information. If yes, the access node 20 may decide none of the target cells is capable of supporting the service request and transmit a rejection message (e.g. a RRC message) indicating a rejection to the service request to the UE 10.

On the other hand, if the access node 20 determines the slice instances in the current cell are not overloaded, the access node 20 may decide the current cell as the target cell to be connected (step S325) and then determine whether the target cell is in the access node 20 (step S326). If target cell is in the access node 20, the access node 20 may transmit an intra-node handover command to the UE 10 so as configure the connection between the UE 10 and the target cell in the access node 20 (step S327).

If target cell is not in the access node 20, the access node 20 may further determine whether the UE 10 is in an active mode (step S328). Since the UE 10 may enter an idle mode or inactive mode due to power saving but still camp on the access node 20, if the UE 10 is determined as not in the active mode (e.g. in the idle mode or the inactive mode), the access node 20 is required to send a release message (e.g. a RRC message) with redirection information to the UE 10, so as to configure the connection between the UE 10 and the target cell in the corresponding neighbor node (step S330). If the UE 10 is determined as in the active mode, the access node 20 may transmit an inter-node handover command to the UE 10 to configure the connection between the UE 10 and the target cell in the corresponding neighbor node.

Figure 4:
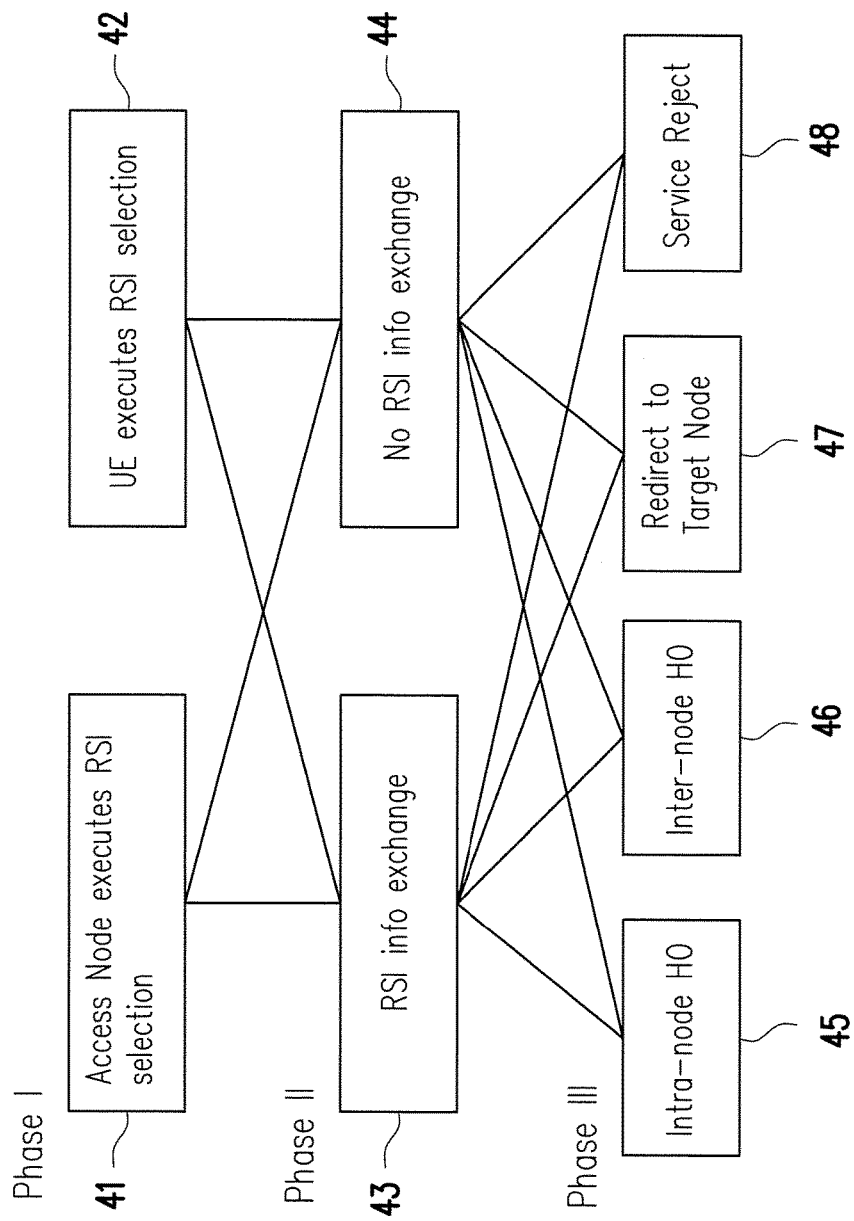
FIG. 4 is an overview of the relationship among the three phases of RSI selection according to an embodiment of the application.

Based on the above, it is noted that the RSI selection of the present application may be divided into three phases. FIG. 4 is an overview of the relationship among the three phases of RSI selection according to an embodiment of the application. Referring to FIG. 4, in Phase I, a condition that the access node executes RSI selection 41 or the UE executes RSI selection 42 is determined. In Phase II, a condition that RSI information exchange between nodes 43 or no RSI information exchange between nodes 44 is determined. In Phase III, a condition of performing intra-node handover (HO) 45, inter-node HO 46, redirect to target node 47, and service reject 48 is determined. Based on the permutations of the conditions in above three Phases, various embodiments are respectively given below for further illustration.

FIG. 5A to FIG. 5D are schematic diagrams illustrating a slice-based handover method according to an embodiment of the application. The embodiments illustrated in FIG. 5A to FIG. 5D all comply with the conditions that the access node 20 executes RSI selection in Phase I and RSI information is exchanged via Xn interface in Phase II, but respectively comply with the various conditions (i.e. the conditions 45 to 48) in Phase III.

Figure 5A:
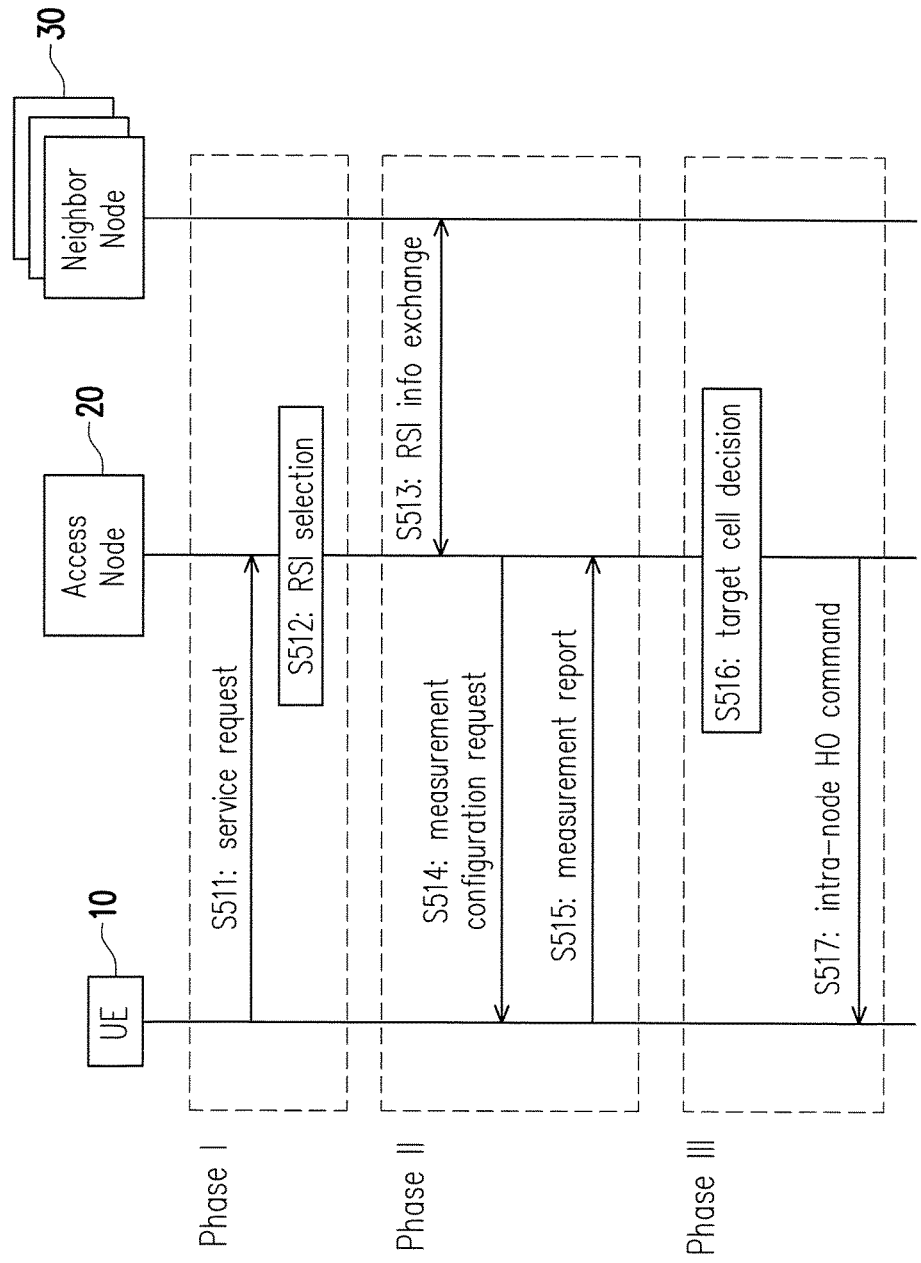
FIG. 5A to FIG. 5D are schematic diagrams illustrating a slice-based handover method according to an embodiment of the application.

In the embodiments of FIG. 5A, the conditions are set the access node 20 executes RSI selection in Phase I; RSI information is exchanged via Xn interface in Phase II; and an intra-node handover is performed in Phase III. The steps of the slice-based handover method includes:

Step S511: the UE 10 sends a service request to the access node 20 via a RRC message including information of an application service type, QoS parameters, and RSSAI;

Step S512: the access node 20 selects RSI(s) which may support the service requirements for the service request.

Step S513: the access node 20 periodically exchange RSI information with neighbor nodes 30 via Xn interface, such as RSI capability, RSI(s) load information of the neighbor nodes 30;

Step S514: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S515: the UE 10 performs measurements of the measurement objects with respect to each candidate RSI(s) and sends a measurement report to the access node 20;

Step S516: the access node 20 decides the target cell and RSI, wherein the decided target cell is in the access node 20 itself; and Step S517: the access node 20 sends an intra-node HO command via a RRC message including the mobility control information with necessary parameters (e.g. PCI, RSI ID(s), and access stratum (AS)-configuration) to the UE 10, so as to control the UE 10 to configure a connection with the target cell.

Figure 5B:
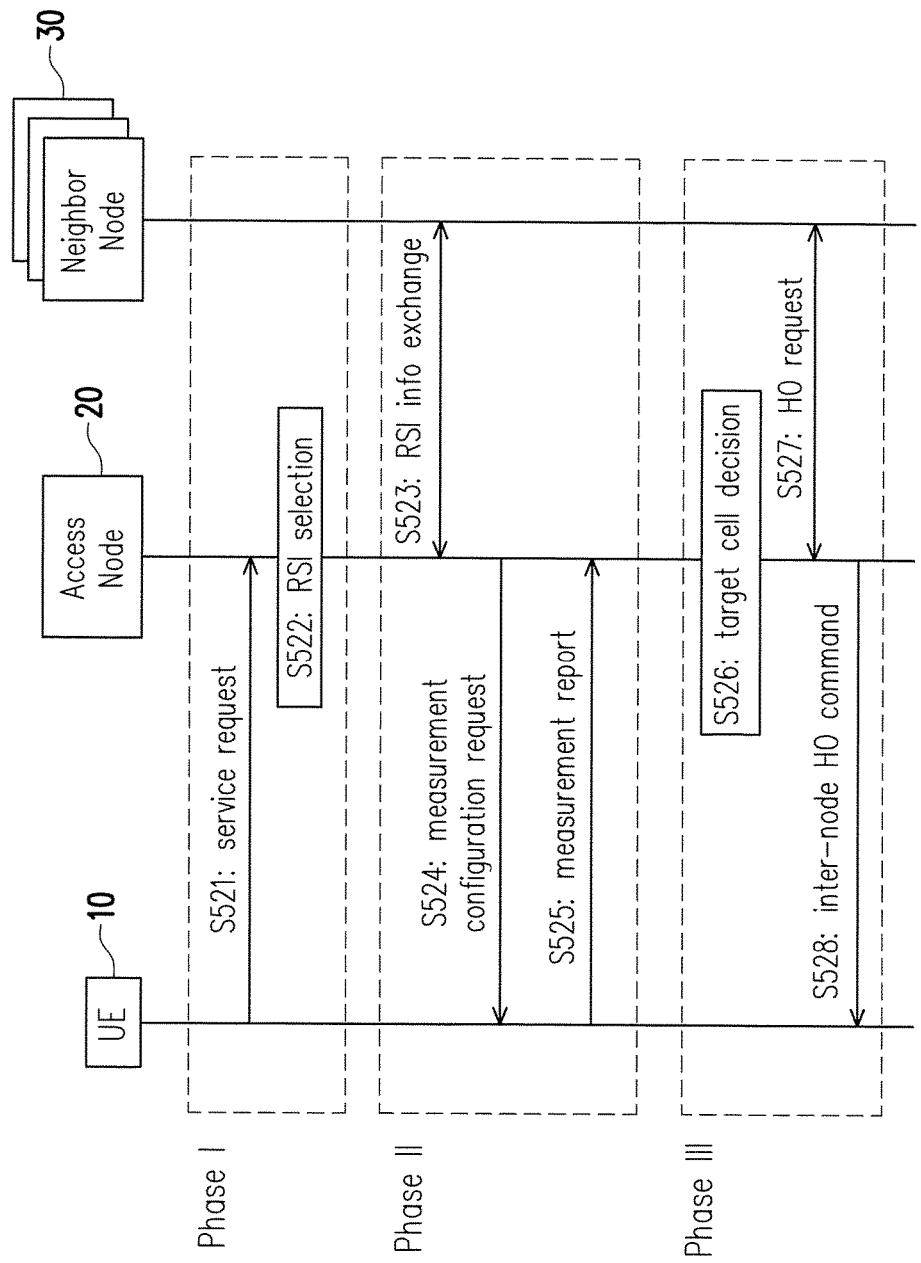

In the embodiments of FIG. 5B, the conditions are set the access node 20 executes RSI selection in Phase I; RSI information is exchanged via Xn interface in Phase II; and an inter-node handover is performed in Phase III. The steps of the slice-based handover method includes:

Step S521: the UE 10 sends a service request to the access node 20 via a RRC message including information of an application service type, QoS parameters, and RSSAI;

Step S522: the access node 20 selects RSI(s) which may support the service requirements for the service request;

Step S523: the access node 20 periodically exchange RSI information with neighbor nodes 30 via Xn interface, such as RSI capability, RSI(s) load information of the neighbor nodes 30;

Step S524: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S525: the UE 10 performs measurements of the measurement objects with respect to each candidate RSI(s) and sends a measurement report to the access node 20;

Step S526: the access node 20 decides the target cell and RSI, wherein the decided target cell is in the neighbor node 30 and an inter-node handover is required;

Step S527: the access node 20 issues a handover (HO) request via a RRC message to the target node 30 to pass necessary handover information to prepare the HO at the target side. The target node 30 prepares HO with L1/L2 and send the handover request acknowledge (ACK) message to the access node 20; and Step S527: the access node 20 sends an inter-node HO command via a RRC message including the mobility control information with necessary parameters (e.g. PCI, RSI ID(s), and AS-configuration) to the UE 10, so as to control the UE 10 to configure a connection with the target cell in the target node 30.

Figure 5C:
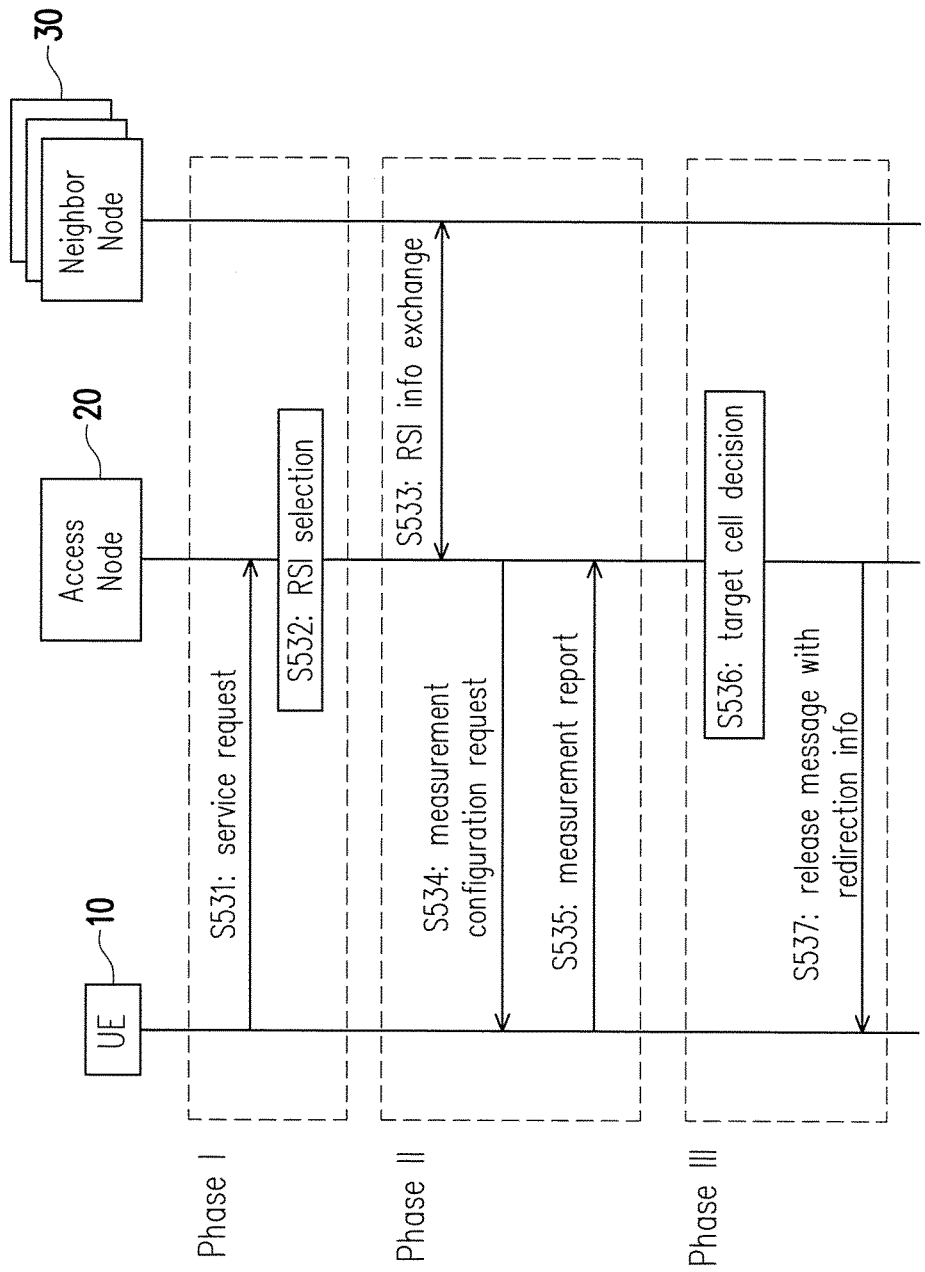

In the embodiments of FIG. 5C, the conditions are set the access node 20 executes RSI selection in Phase I; RSI information is exchanged via Xn interface in Phase II; and a redirection to the target node is performed in Phase III. The steps of the slice-based handover method includes:

Step S531: the UE 10 sends a service request to the access node 20 via a RRC message including information of an application service type, QoS parameters, and RSSAI;

Step S532: the access node 20 selects RSI(s) which may support the service requirements for the service request;

Step S533: the access node 20 periodically exchange RSI information with neighbor nodes 30 via Xn interface, such as RSI capability, RSI(s) load information of the neighbor nodes 30;

Step S534: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S535: the UE 10 performs measurements of the measurement objects with respect to each candidate RSI(s) and sends a measurement report to the access node 20;

Step S536: the access node 20 decides the target cell and RSI, wherein the decided target cell is in the neighbor node 30; and Step S537: the access node 20 determines that there is no user plane connection of the UE 10, and therefore sends a release message with redirection information (e.g. PCI, RSI ID(s), and access stratum (AS)-configuration) to the UE 10, so as to control the UE 10 to configure a connection with the target cell.

Figure 5D:
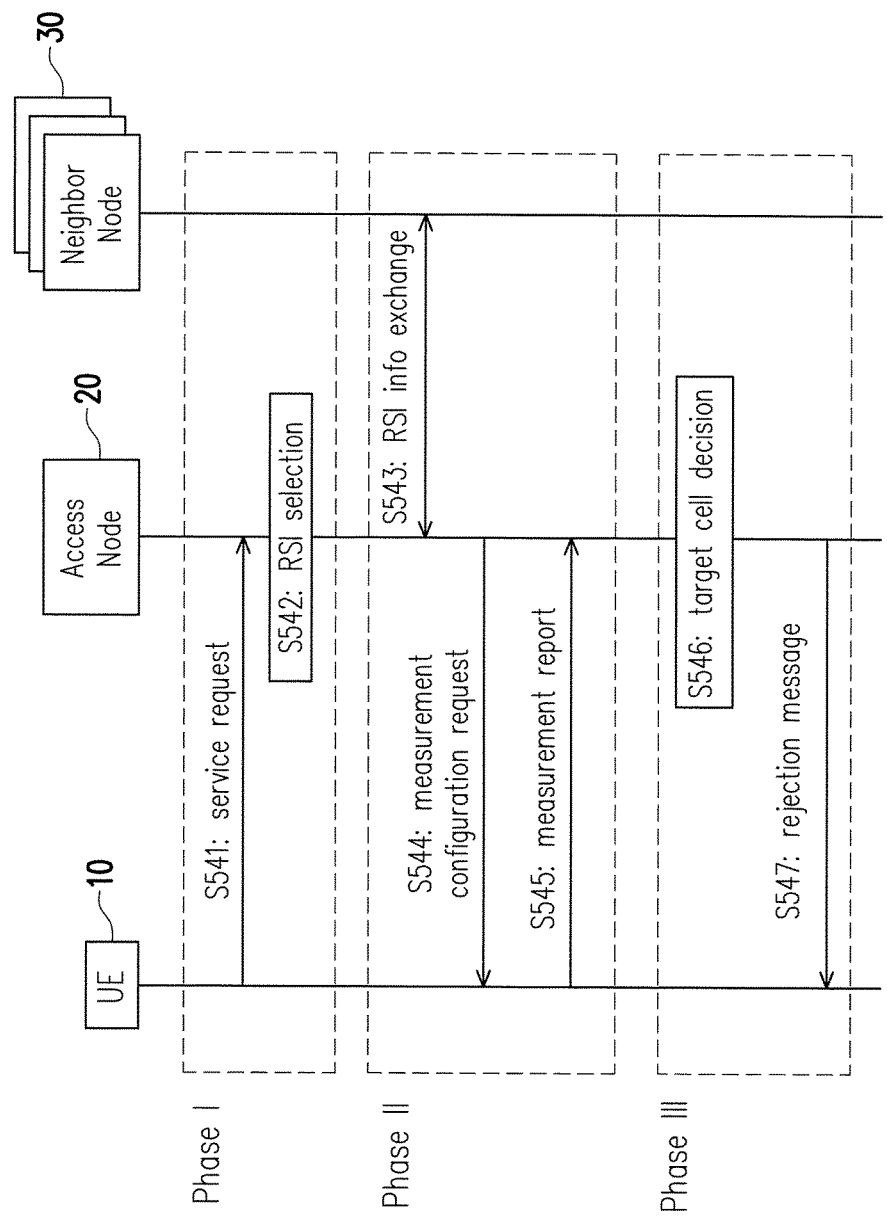

In the embodiments of FIG. 5D, the conditions are set the access node 20 executes RSI selection in Phase I; RSI information is exchanged via Xn interface in Phase II; and a service rejection is performed in Phase III. The steps of the slice-based handover method includes:

Step S541: the UE 10 sends a service request to the access node 20 via a RRC message including information of an application service type, QoS parameters, and RSSAI;

Step S542: the access node 20 selects RSI(s) which may support the service requirements for the service request;

Step S543: the access node 20 periodically exchange RSI information with neighbor nodes 30 via Xn interface, such as RSI capability, RSI(s) load information of the neighbor nodes 30;

Step S544: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S545: the UE 10 performs measurements of the measurement objects with respect to each candidate RSI(s) and sends a measurement report to the access node 20;

Step S546: the access node 20 decides no target cell can support the service request; and Step S547: the access node 20 sends a rejection message to the UE 10, so as to reject the service request of the UE 10.

FIG. 6A to FIG. 6D are schematic diagrams illustrating a slice-based handover method according to an embodiment of the application. The embodiments illustrated in FIG. 6A to FIG. 6D all comply with the conditions that the access node 20 executes RSI selection in Phase I and no RSI information is exchanged via Xn interface in Phase II, but respectively comply with the various conditions (i.e. the conditions 45 to 48) in Phase III.

Figure 6A:
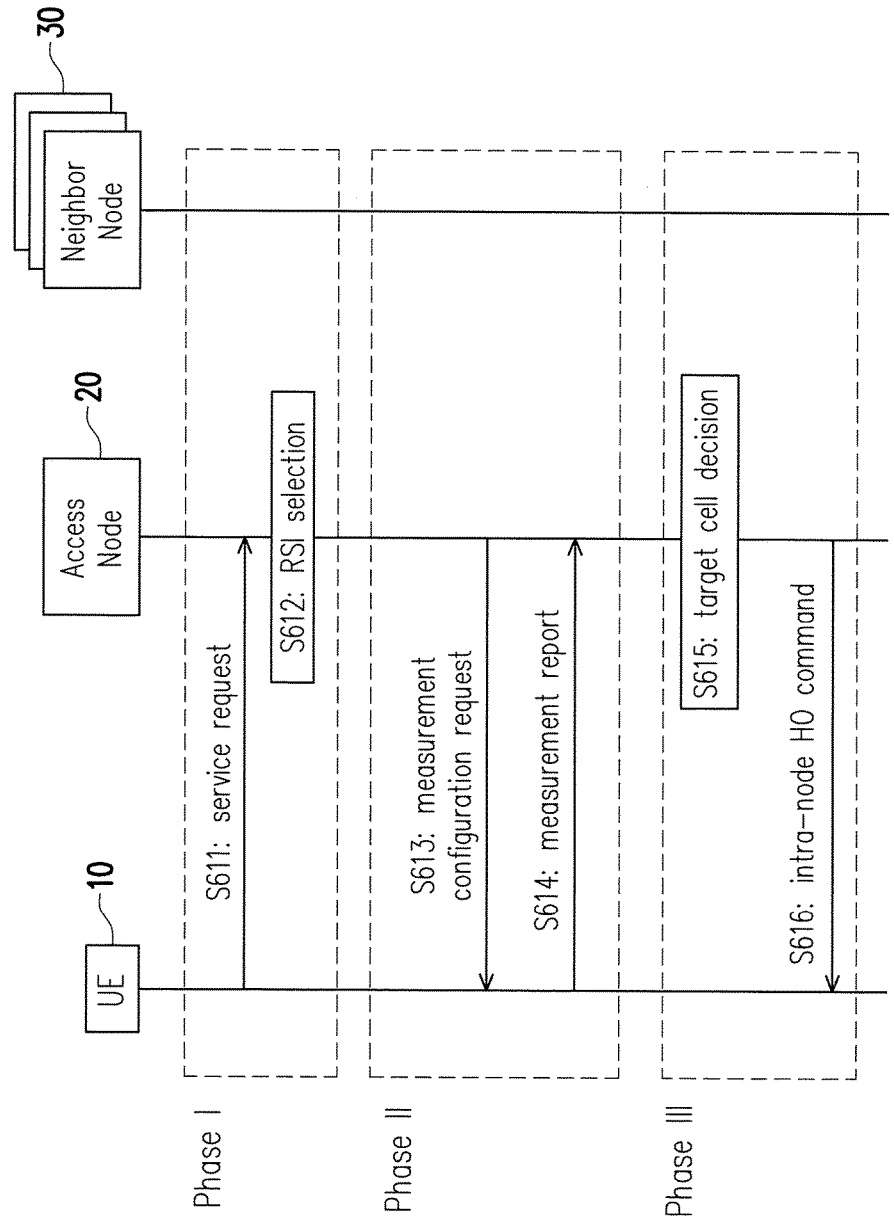
FIG. 6A to FIG. 6D are schematic diagrams illustrating a slice-based handover method according to an embodiment of the application.

In the embodiments of FIG. 6A, the conditions are set the access node 20 executes RSI selection in Phase I; no RSI information is exchanged via Xn interface in Phase II; and an intra-node handover is performed in Phase III. The steps of the slice-based handover method includes:

Step S611: the UE 10 sends a service request to the access node 20 via a RRC message including information of an application service type, QoS parameters, and RSSAI;

Step S612: the access node 20 selects RSI(s) which may support the service requirements for the service request;

Step S613: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S614: the UE 10 performs measurements of the measurement objects with respect to each candidate RSI(s) and sends a measurement report to the access node 20;

Step S615: the access node 20 decides the target cell and RSI, wherein the decided target cell is in the access node 20 itself; and Step S616: the access node 20 sends an intra-node HO command via a RRC message including the mobility control information with necessary parameters (e.g. PCI, RSI ID(s), and access stratum (AS)-configuration) to the UE 10, so as to control the UE 10 to configure a connection with the target cell.

Figure 6B:
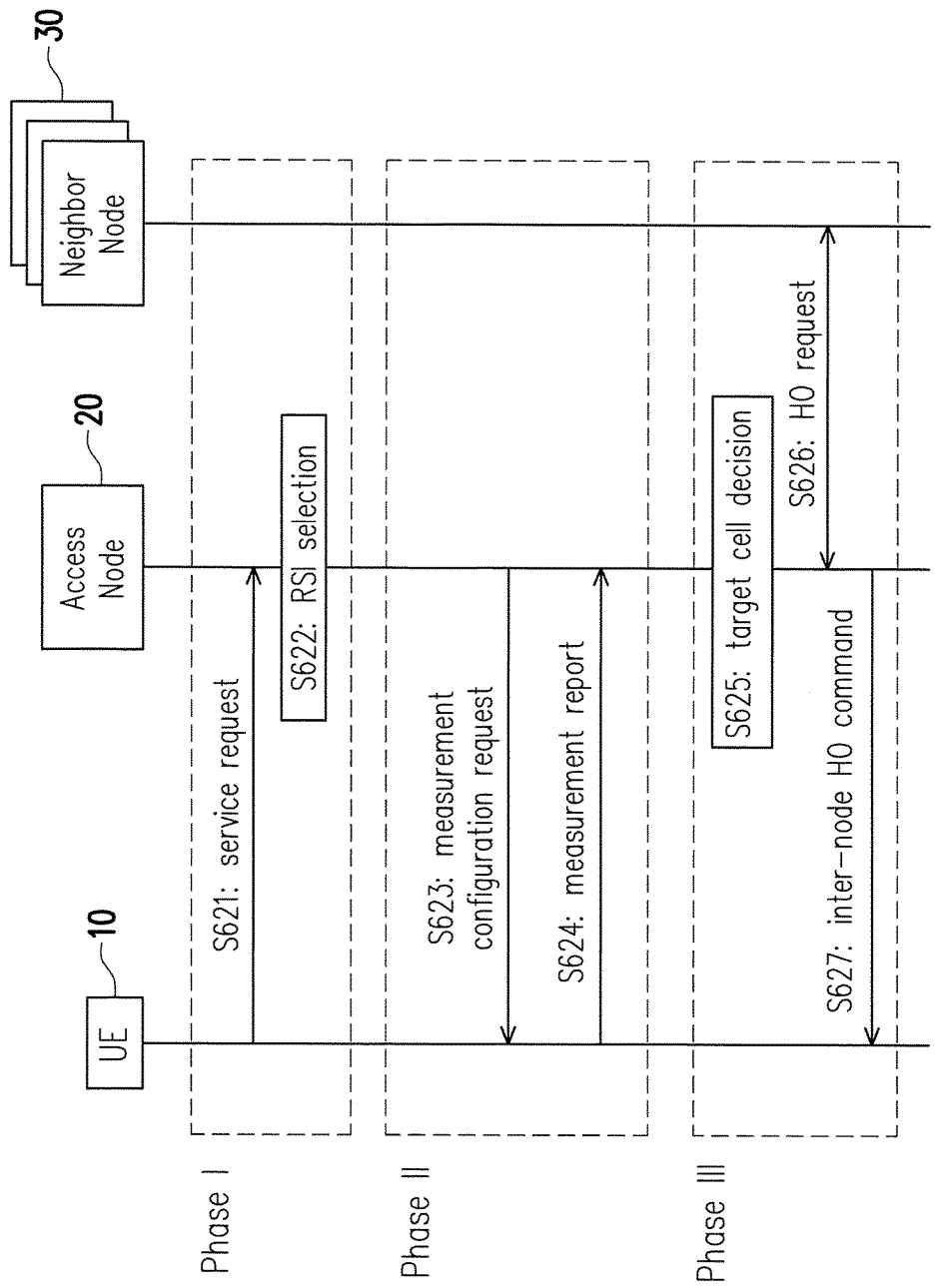

In the embodiments of FIG. 6B, the conditions are set the access node 20 executes RSI selection in Phase I; no RSI information is exchanged via Xn interface in Phase II; and an inter-node handover is performed in Phase III. The steps of the slice-based handover method includes:

Step S621: the UE 10 sends a service request to the access node 20 via a RRC message including information of an application service type, QoS parameters, and RSSAI;

Step S622: the access node 20 selects RSI(s) which may support the service requirements for the service request;

Step S623: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S624: the UE 10 performs measurements of the measurement objects with respect to each candidate RSI(s) and sends a measurement report to the access node 20;

Step S625: the access node 20 decides the target cell and RSI, wherein the decided target cell is in the neighbor node 30 and an inter-node handover is required;

Step S626: the access node 20 issues a handover (HO) request via a RRC message to the target node 30 to pass necessary handover information to prepare the HO at the target side. The target node 30 prepares HO with L1/L2 and send the handover request acknowledge (ACK) message to the access node 20; and Step S627: the access node 20 sends an inter-node HO command via a RRC message including the mobility control information with necessary parameters (e.g. PCI, RSI ID(s), and AS-configuration) to the UE 10, so as to control the UE 10 to configure a connection with the target cell in the target node 30.

Figure 6C:
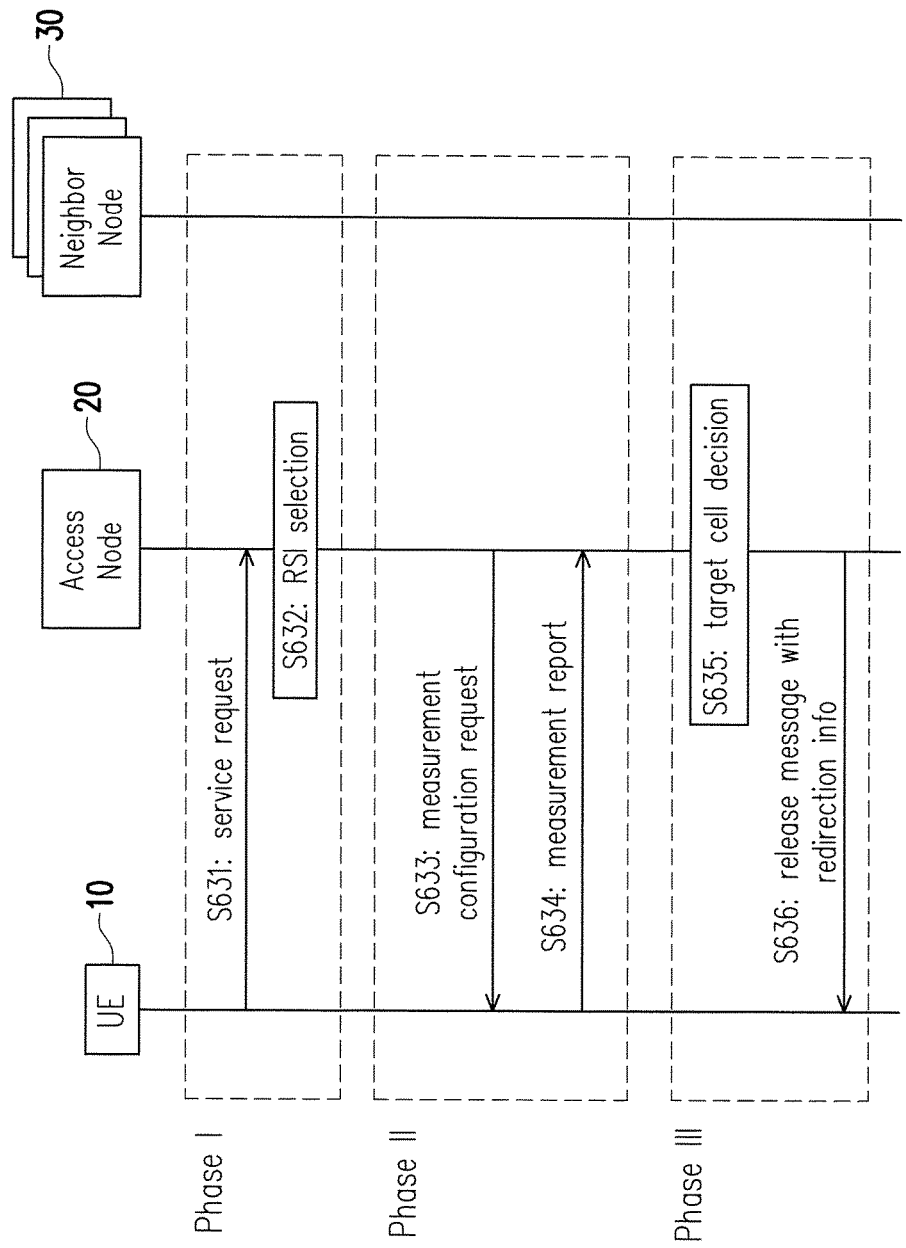
Figure 6D:
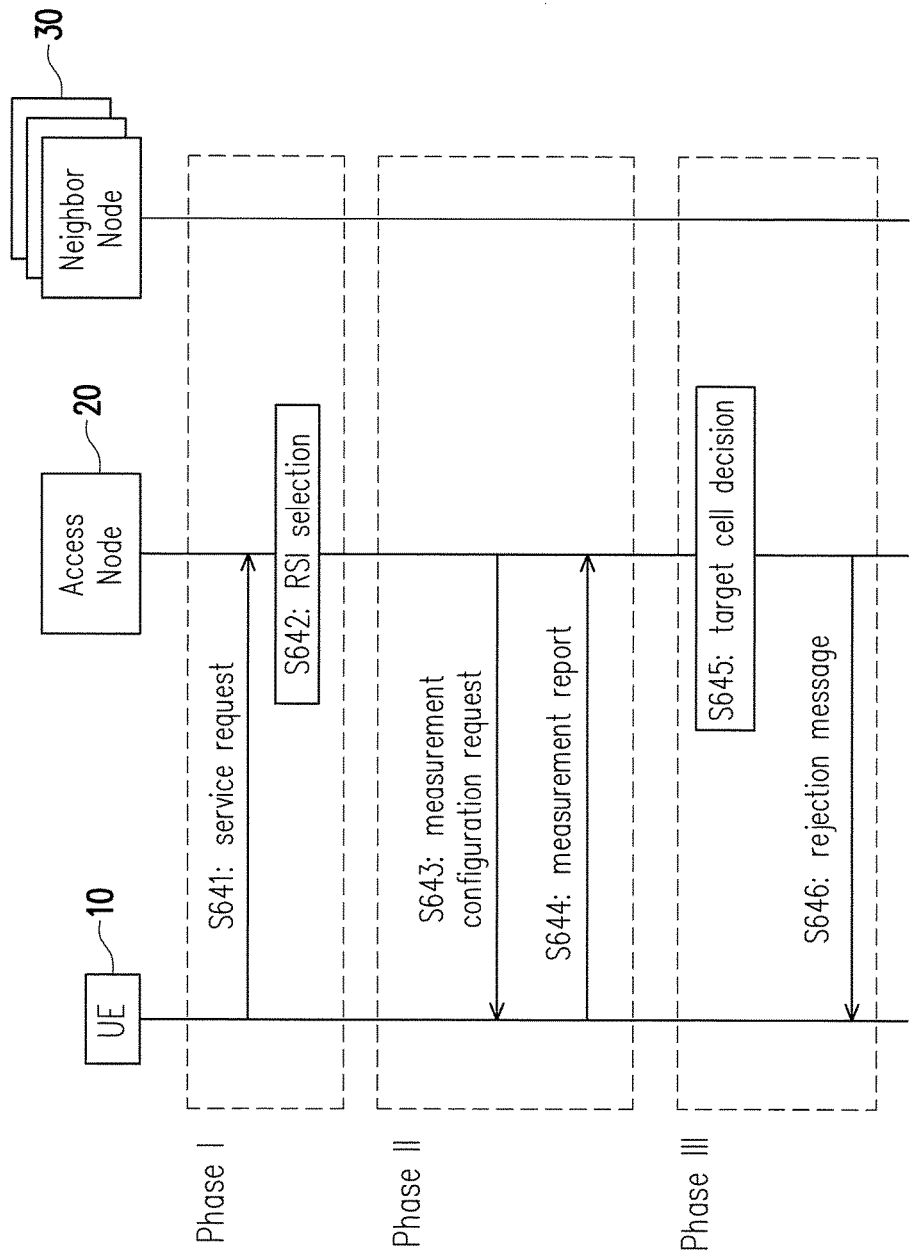

In the embodiments of FIG. 6C, the conditions are set the access node 20 executes RSI selection in Phase I; no RSI information is exchanged via Xn interface in Phase II; and a redirection to the target node is performed in Phase III. The steps of the slice-based handover method includes:

Step S631: the UE 10 sends a service request to the access node 20 via a RRC message including information of an application service type, QoS parameters, and RSSAI;

Step S632: the access node 20 selects RSI(s) which may support the service requirements for the service request;

Step S633: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S634: the UE 10 performs measurements of the measurement objects with respect to each candidate RSI(s) and sends a measurement report to the access node 20;

Step S635: the access node 20 decides the target cell and RSI, wherein the decided target cell is in the neighbor node 30; and Step S636: the access node 20 determines that there is no user plane connection of the UE 10, and therefore sends a release message with redirection information (e.g. PCI, RSI ID(s), and access stratum (AS)-configuration) to the UE 10, so as to control the UE 10 to configure a connection with the target cell.

In the embodiments of FIG. 5D, the conditions are set the access node 20 executes RSI selection in Phase I; no RSI information is exchanged via Xn interface in Phase II; and a service rejection is performed in Phase III. The steps of the slice-based handover method includes:

Step S641: the UE 10 sends a service request to the access node 20 via a RRC message including information of an application service type, QoS parameters, and RSSAI;

Step S642: the access node 20 selects RSI(s) which may support the service requirements for the service request;

Step S643: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S644: the UE 10 performs measurements of the measurement objects with respect to each candidate RSI(s) and sends a measurement report to the access node 20;

Step S645: the access node 20 decides no target cell can support the service request; and Step S646: the access node 20 sends a rejection message to the UE 10, so as to reject the service request of the UE 10.

FIG. 7A to FIG. 7D are schematic diagrams illustrating a slice-based handover method according to an embodiment of the application. The embodiments illustrated in FIG. 7A to FIG. 7D all comply with the conditions that the UE 10 executes RSI selection in Phase I and RSI information is exchanged via Xn interface in Phase II, but respectively comply with the various conditions (i.e. the conditions 45 to 48) in Phase III.

Figure 7A:
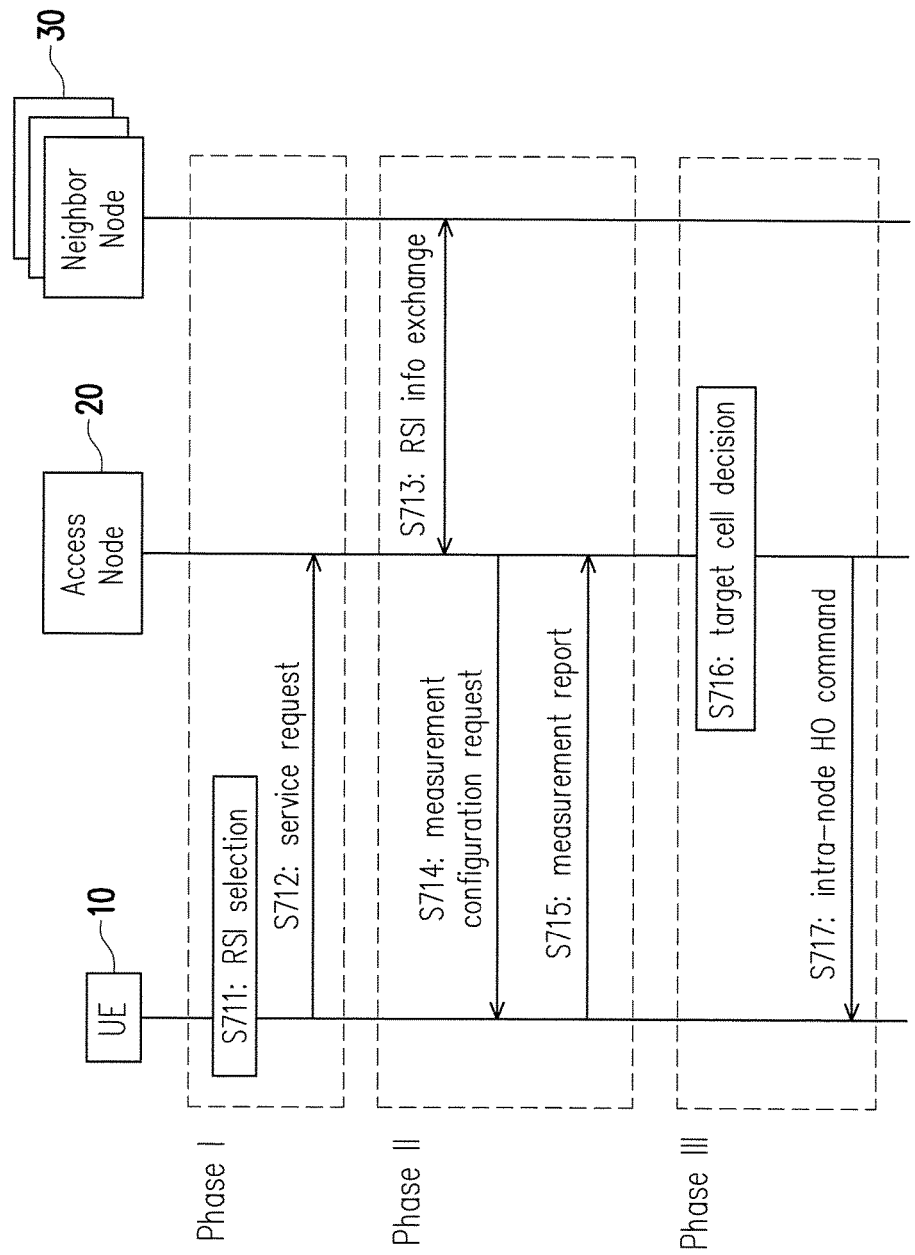
FIG. 7A to FIG. 7D are schematic diagrams illustrating a slice-based handover method according to an embodiment of the application.

In the embodiments of FIG. 7A, the conditions are set the UE 10 executes RSI selection in Phase I; RSI information is exchanged via Xn interface in Phase II; and an intra-node handover is performed in Phase III. The steps of the slice-based handover method includes:

Step S711: the UE 10 selects RSI(s) which may support the service requirements for the service request;

Step S712: the UE 10 sends a service request to the access node 20 via a RRC message including information of an application service type, QoS parameters, and the selected RSI(s);

Step S713: the access node 20 periodically exchange RSI information with neighbor nodes 30 via Xn interface, such as RSI capability, RSI(s) load information of the neighbor nodes 30;

Step S714: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S715: the UE 10 performs measurements of the measurement objects with respect to each candidate RSI(s) and sends a measurement report to the access node 20;

Step S716: the access node 20 decides the target cell and RSI, wherein the decided target cell is in the access node 20 itself; and Step S717: the access node 20 sends an intra-node HO command via a RRC message including the mobility control information with necessary parameters (e.g. PCI, RSI ID(s), and access stratum (AS)-configuration) to the UE 10, so as to control the UE 10 to configure a connection with the target cell.

Figure 7B:
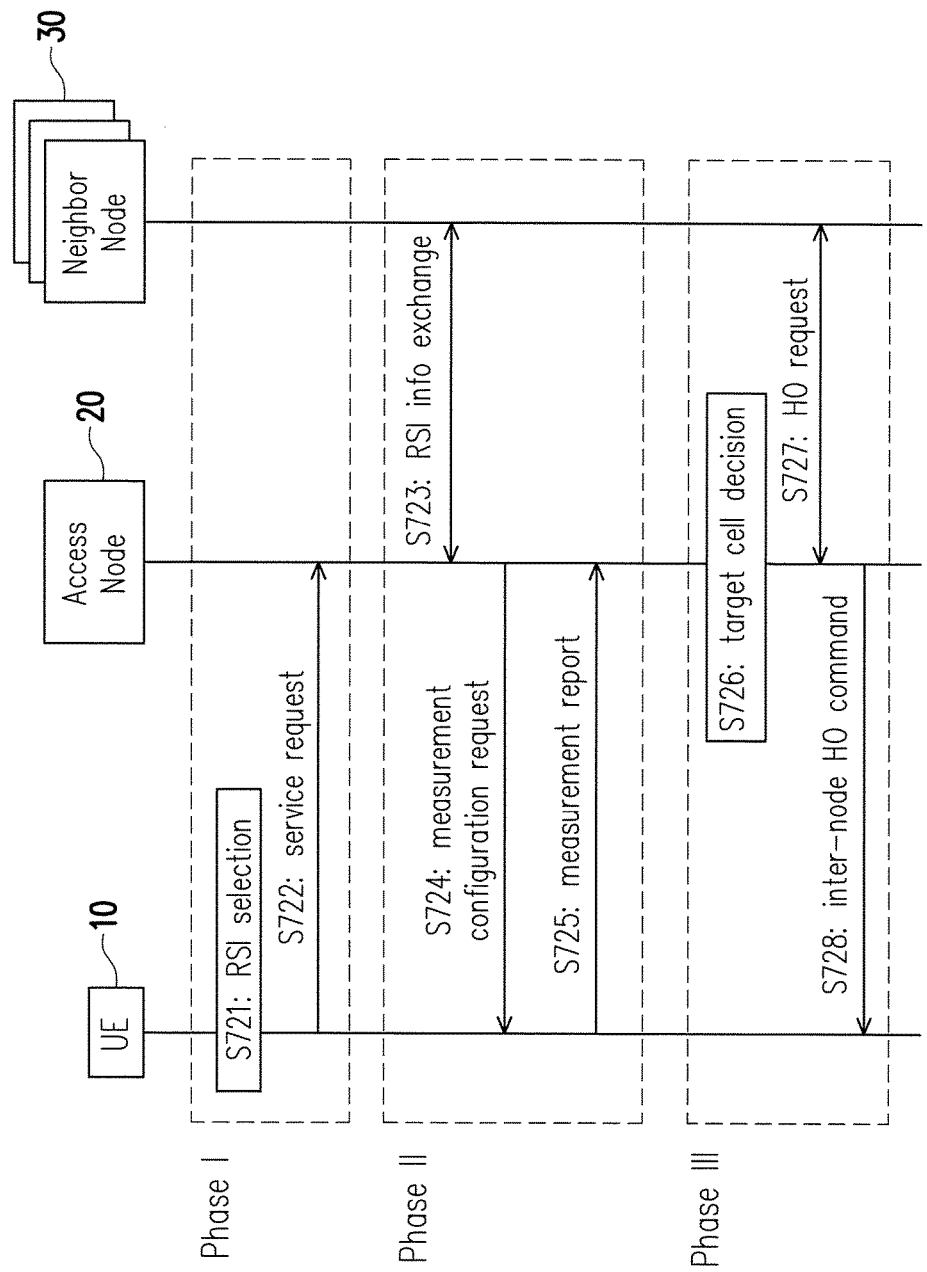

In the embodiments of FIG. 7B, the conditions are set the UE 10 executes RSI selection in Phase I; RSI information is exchanged via Xn interface in Phase II; and an inter-node handover is performed in Phase III. The steps of the slice-based handover method includes:

Step S721: the UE 10 selects RSI(s) which may support the service requirements for the service request;

Step S722: the UE 10 sends a service request to the access node 20 via a RRC message including information of an application service type, QoS parameters, and the selected RSI(s);

Step S723: the access node 20 periodically exchange RSI information with neighbor nodes 30 via Xn interface, such as RSI capability, RSI(s) load information of the neighbor nodes 30;

Step S724: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S725: the UE 10 performs measurements of the measurement objects with respect to each candidate RSI(s) and sends a measurement report to the access node 20;

Step S726: the access node 20 decides the target cell and RSI, wherein the decided target cell is in the neighbor node 30 and an inter-node handover is required;

Step S727: the access node 20 issues a handover (HO) request via a RRC message to the target node 30 to pass necessary handover information to prepare the HO at the target side. The target node 30 prepares HO with L1/L2 and send the handover request acknowledge (ACK) message to the access node 20; and Step S728: the access node 20 sends an inter-node HO command via a RRC message including the mobility control information with necessary parameters (e.g. PCI, RSI ID(s), and AS-configuration) to the UE 10, so as to control the UE 10 to configure a connection with the target cell in the target node 30.

Figure 7C:
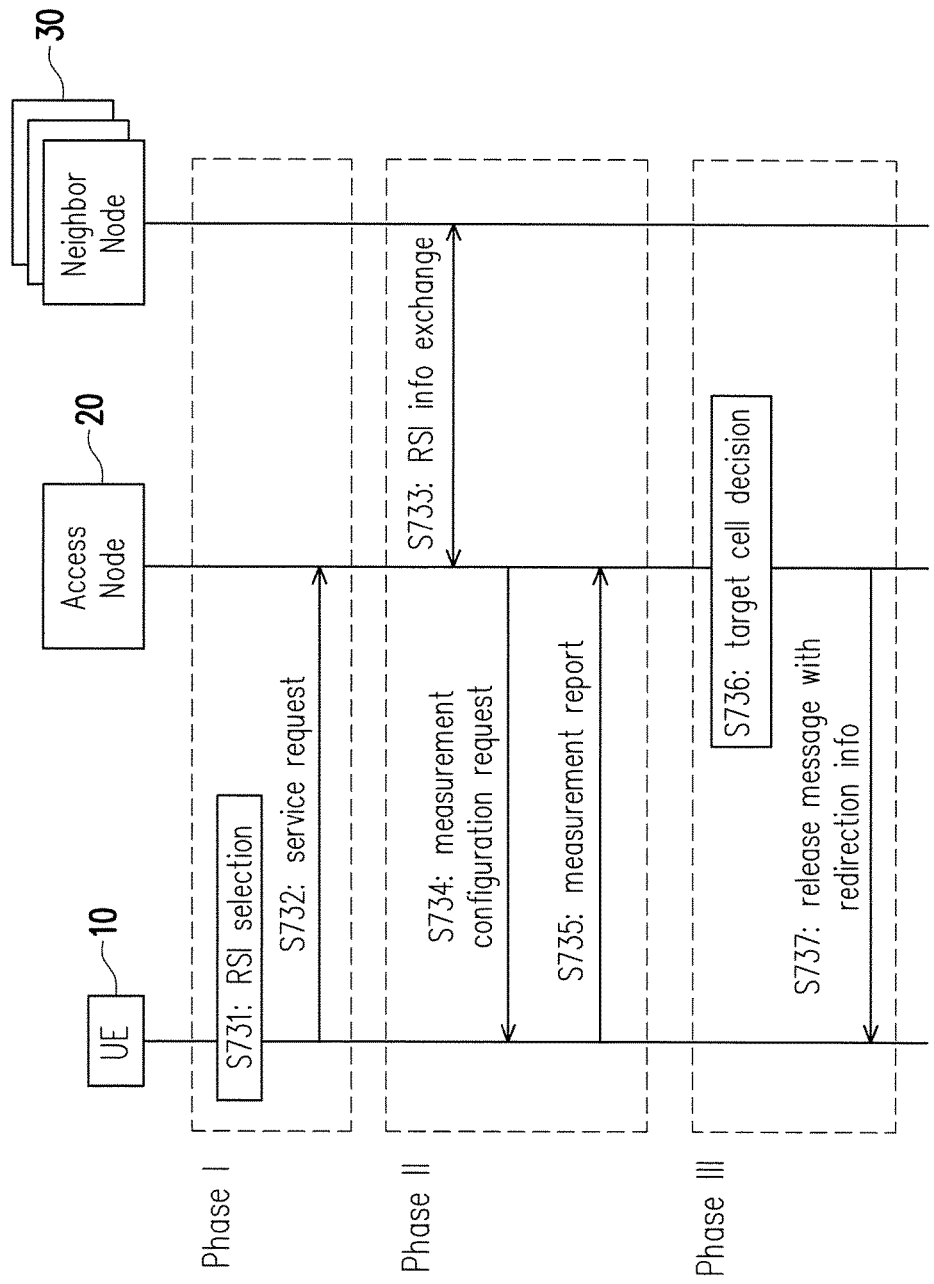

In the embodiments of FIG. 7C, the conditions are set the UE 10 executes RSI selection in Phase I; RSI information is exchanged via Xn interface in Phase II; and a redirection to the target node is performed in Phase III. The steps of the slice-based handover method includes:

Step S731: the UE 10 selects RSI(s) which may support the service requirements for the service request;

Step S732: the UE 10 sends a service request to the access node 20 via a RRC message including information of an application service type, QoS parameters, and the selected RSI(s);

Step S733: the access node 20 periodically exchange RSI information with neighbor nodes 30 via Xn interface, such as RSI capability, RSI(s) load information of the neighbor nodes 30;

Step S734: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S735: the UE 10 performs measurements of the measurement objects with respect to each candidate RSI(s) and sends a measurement report to the access node 20;

Step S736: the access node 20 decides the target cell and RSI, wherein the decided target cell is in the neighbor node 30; and Step S737: the access node 20 determines that there is no user plane connection of the UE 10, and therefore sends a release message with redirection information (e.g. PCI, RSI ID(s), and access stratum (AS)-configuration) to the UE 10, so as to control the UE 10 to configure a connection with the target cell.

Figure 7D:
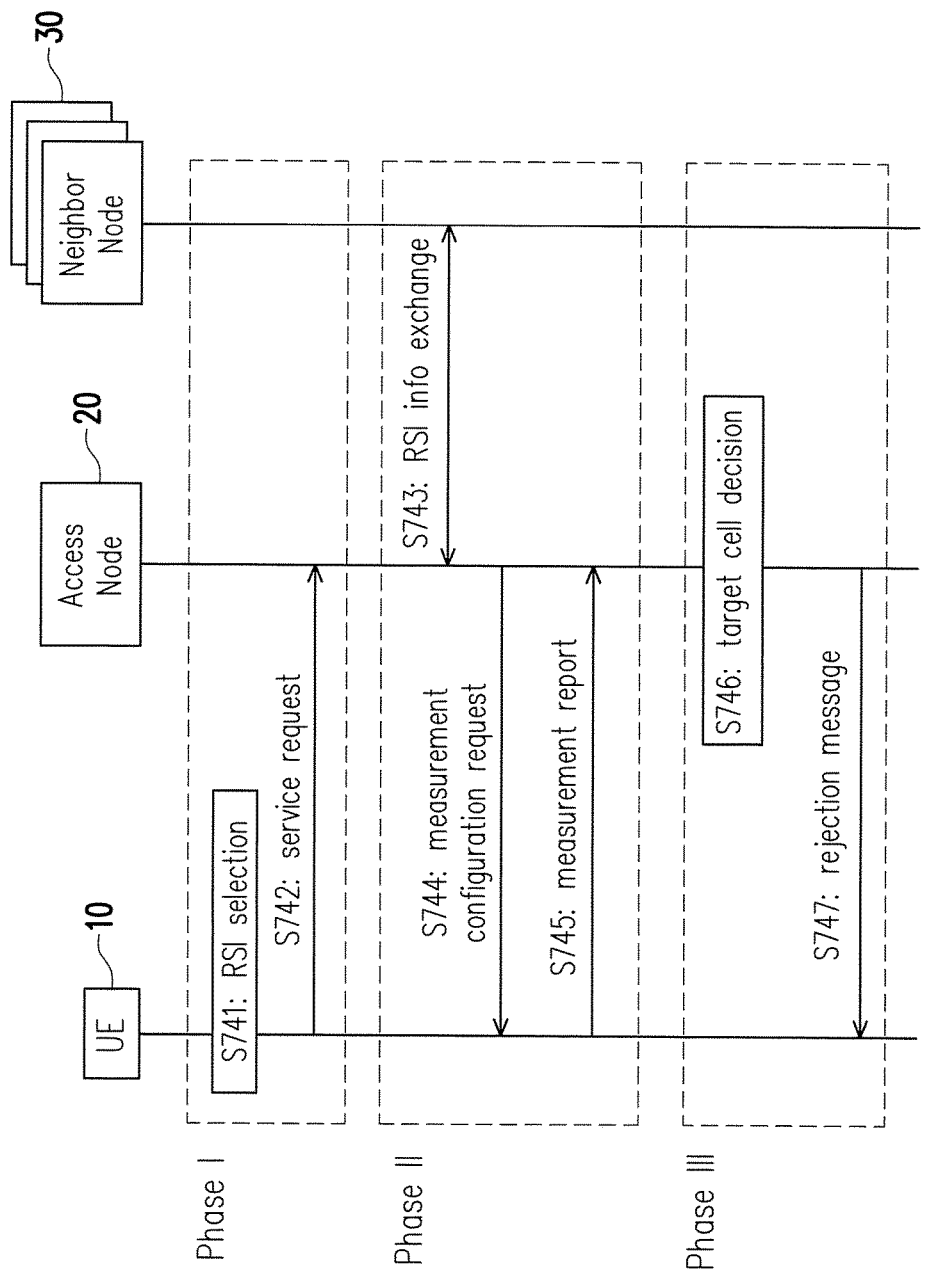

In the embodiments of FIG. 7D, the conditions are set the UE 10 executes RSI selection in Phase I; RSI information is exchanged via Xn interface in Phase II; and a service rejection is performed in Phase III. The steps of the slice-based handover method includes:

Step S741: the UE 10 selects RSI(s) which may support the service requirements for the service request;

Step S742: the UE 10 sends a service request to the access node 20 via a RRC message including information of an application service type, QoS parameters, and the selected RSI(s);

Step S743: the access node 20 periodically exchange RSI information with neighbor nodes 30 via Xn interface, such as RSI capability, RSI(s) load information of the neighbor nodes 30;

Step S744: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S745: the UE 10 performs measurements of the measurement objects with respect to each candidate RSI(s) and sends a measurement report to the access node 20;

Step S746: the access node 20 decides no target cell can support the service request; and Step S747: the access node 20 sends a rejection message to the UE 10, so as to reject the service request of the UE 10.

FIG. 8A to FIG. 8D are schematic diagrams illustrating a slice-based handover method according to an embodiment of the application. The embodiments illustrated in FIG. 8A to FIG. 8D all comply with the conditions that the UE 10 executes RSI selection in Phase I and no RSI information is exchanged via Xn interface in Phase II, but respectively comply with the various conditions (i.e. the conditions 45 to 48) in Phase III.

Figure 8A:
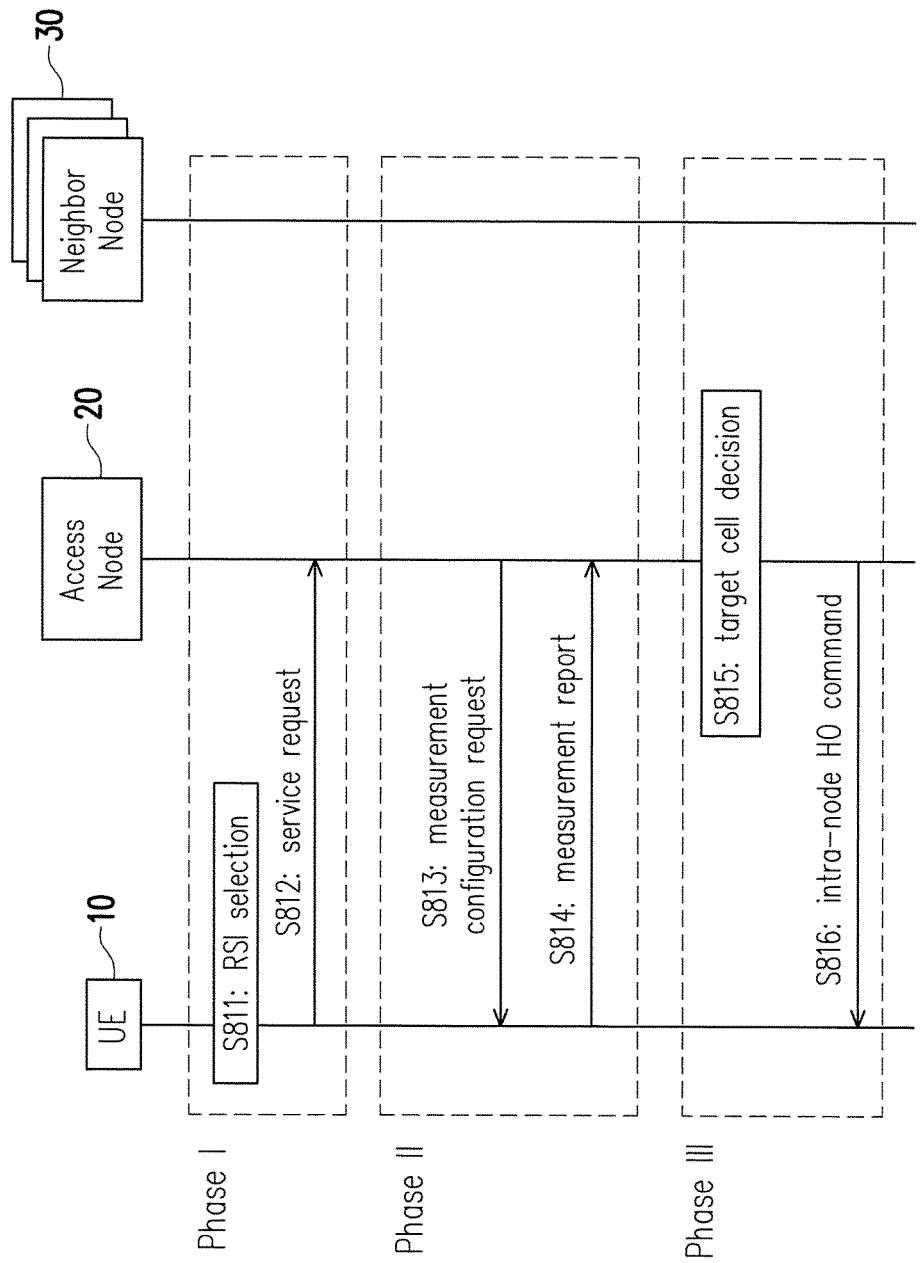

In the embodiments of FIG. 8A, the conditions are set the UE 10 executes RSI selection in Phase I; no RSI information is exchanged via Xn interface in Phase II; and an intra-node handover is performed in Phase III. The steps of the slice-based handover method includes:

Step S811: the UE 10 selects RSI(s) which may support the service requirements for the service request;

Step S812: the UE 10 sends a service request to the access node 20 via a RRC message including information of an application service type, QoS parameters, and the selected RSI(s);

Step S813: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S814: the UE 10 performs measurements of the measurement objects with respect to each candidate RSI(s) and sends a measurement report to the access node 20;

Step S815: the access node 20 decides the target cell and RSI, wherein the decided target cell is in the access node 20 itself; and Step S816: the access node 20 sends an intra-node HO command via a RRC message including the mobility control information with necessary parameters (e.g. PCI, RSI ID(s), and access stratum (AS)-configuration) to the UE 10, so as to control the UE 10 to configure a connection with the target cell.

In the embodiments of FIG. 8B, the conditions are set the UE 10 executes RSI selection in Phase I; no RSI information is exchanged via Xn interface in Phase II; and an inter-node handover is performed in Phase III. The steps of the slice-based handover method includes:

Step S821: the UE 10 selects RSI(s) which may support the service requirements for the service request;

Step S822: the UE 10 sends a service request to the access node 20 via a RRC message including information of an application service type, QoS parameters, and the selected RSI(s);

Step S823: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S824: the UE 10 performs measurements of the measurement objects with respect to each candidate RSI(s) and sends a measurement report to the access node 20;

Step S825: the access node 20 decides the target cell and RSI, wherein the decided target cell is in the neighbor node 30 and an inter-node handover is required;

Step S826: the access node 20 issues a handover (HO) request via a RRC message to the target node 30 to pass necessary handover information to prepare the HO at the target side. The target node 30 prepares HO with L1/L2 and send the handover request acknowledge (ACK) message to the access node 20; and Step S827: the access node 20 sends an inter-node HO command via a RRC message including the mobility control information with necessary parameters (e.g. PCI, RSI ID(s), and AS-configuration) to the UE 10, so as to control the UE 10 to configure a connection with the target cell in the target node 30.

Figure 8C:
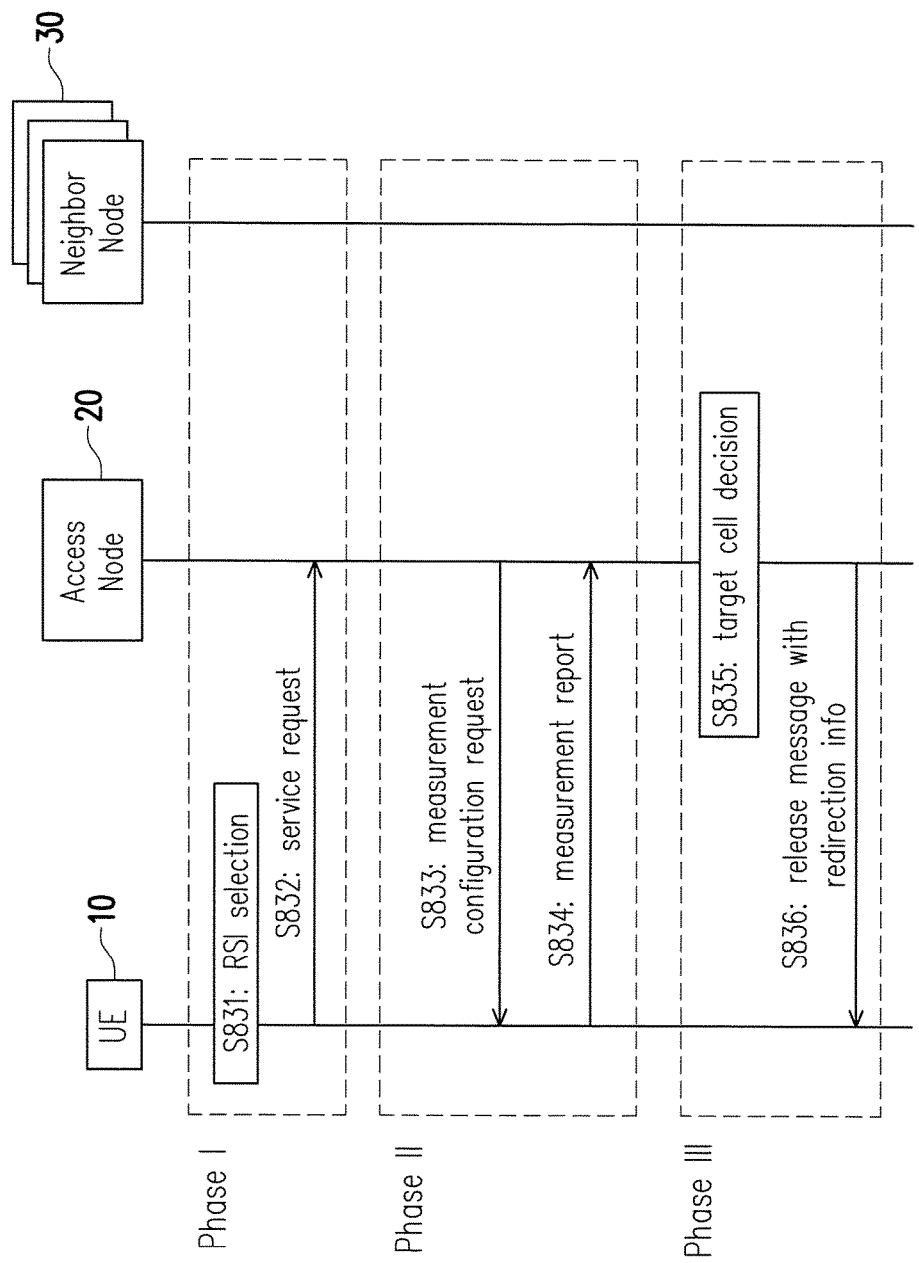

In the embodiments of FIG. 8C, the conditions are set the UE 10 executes RSI selection in Phase I; no RSI information is exchanged via Xn interface in Phase II; and a redirection to the target node is performed in Phase III. The steps of the slice-based handover method includes:

Step S831: the UE 10 selects RSI(s) which may support the service requirements for the service request;

Step S832: the UE 10 sends a service request to the access node 20 via a RRC message including information of an application service type, QoS parameters, and the selected RSI(s);

Step S833: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S834: the UE 10 performs measurements of the measurement objects with respect to each candidate RSI(s) and sends a measurement report to the access node 20;

Step S835: the access node 20 decides the target cell and RSI, wherein the decided target cell is in the neighbor node 30; and Step S836: the access node 20 determines that there is no user plane connection of the UE 10, and therefore sends a release message with redirection information (e.g. PCI, RSI ID(s), and access stratum (AS)-configuration) to the UE 10, so as to control the UE 10 to configure a connection with the target cell.

Figure 8D:
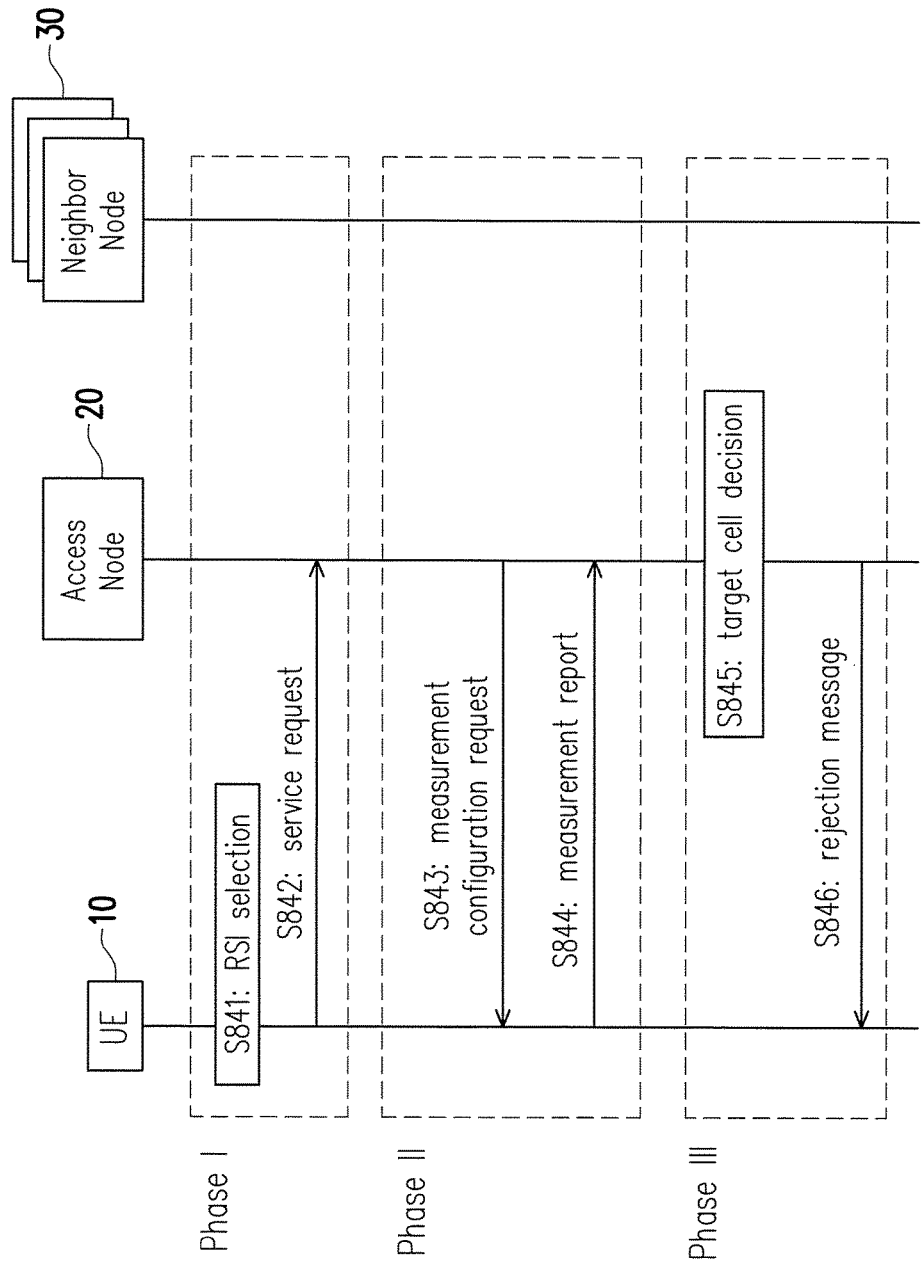

In the embodiments of FIG. 8D, the conditions are set the UE 10 executes RSI selection in Phase I; no RSI information is exchanged via Xn interface in Phase II; and a service rejection is performed in Phase III. The steps of the slice-based handover method includes:

Step S841: the UE 10 selects RSI(s) which may support the service requirements for the service request;

Step S842: the UE 10 sends a service request to the access node 20 via a RRC message including information of an application service type, QoS parameters, and the selected RSI(s);

Step S843: the access node 20 configures the UE measurement procedures according to the candidate RSI(s), assigned PCI(s), the application service type and further information such as the available multiple frequency band information, and sends a measurement configuration request containing aforesaid information to the UE 10. Since this is a service-oriented measurement configuration, the trigger criteria may be based on cell quality;

Step S844: the UE 10 performs measurements of the measurement objects with respect to each candidate RSI(s) and sends a measurement report to the access node 20;

Step S845: the access node 20 decides no target cell can support the service request; and Step S846: the access node 20 sends a rejection message to the UE 10, so as to reject the service request of the UE 10.

It is noted that, in the case that the UE executes RSI selection, the slice instance information provided to the UE may include one of the following information for the current cell and optionally for neighbor cells: (1) one bit to indicate whether an application service type (e.g. URLLC) is supported (i.e. 0 represents not support and 1 represents support); (2) multiple bits each of which indicates whether an application service type is supported (e.g. three bits 010 may represent that eMBB is not supported based on the first bit 0, URLLC is supported based on the second bit 1, and mIoT is not supported based on the last bit 0); and (3) multiple factors each of indicates a camping factor for an application service type and the factor may be related to the number of the supported slice instances (e.g. 0.2 for eMBB, 0.7 for URLLC, and 0 for mIoT).

Figure 9A:
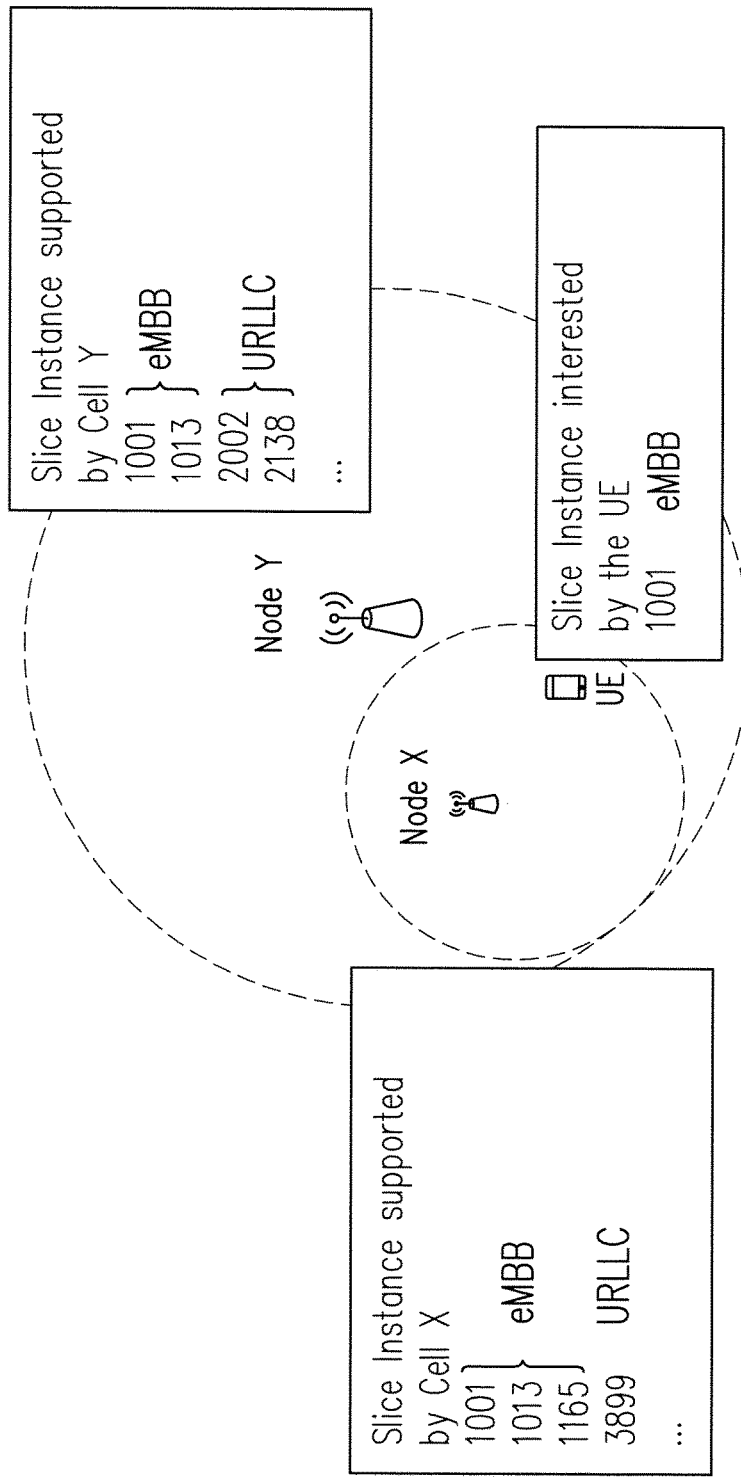
FIG. 9A and FIG. 9B are schematic diagrams illustrating cell selection procedure of the UE according to an embodiment of the application.
Figure 9B:
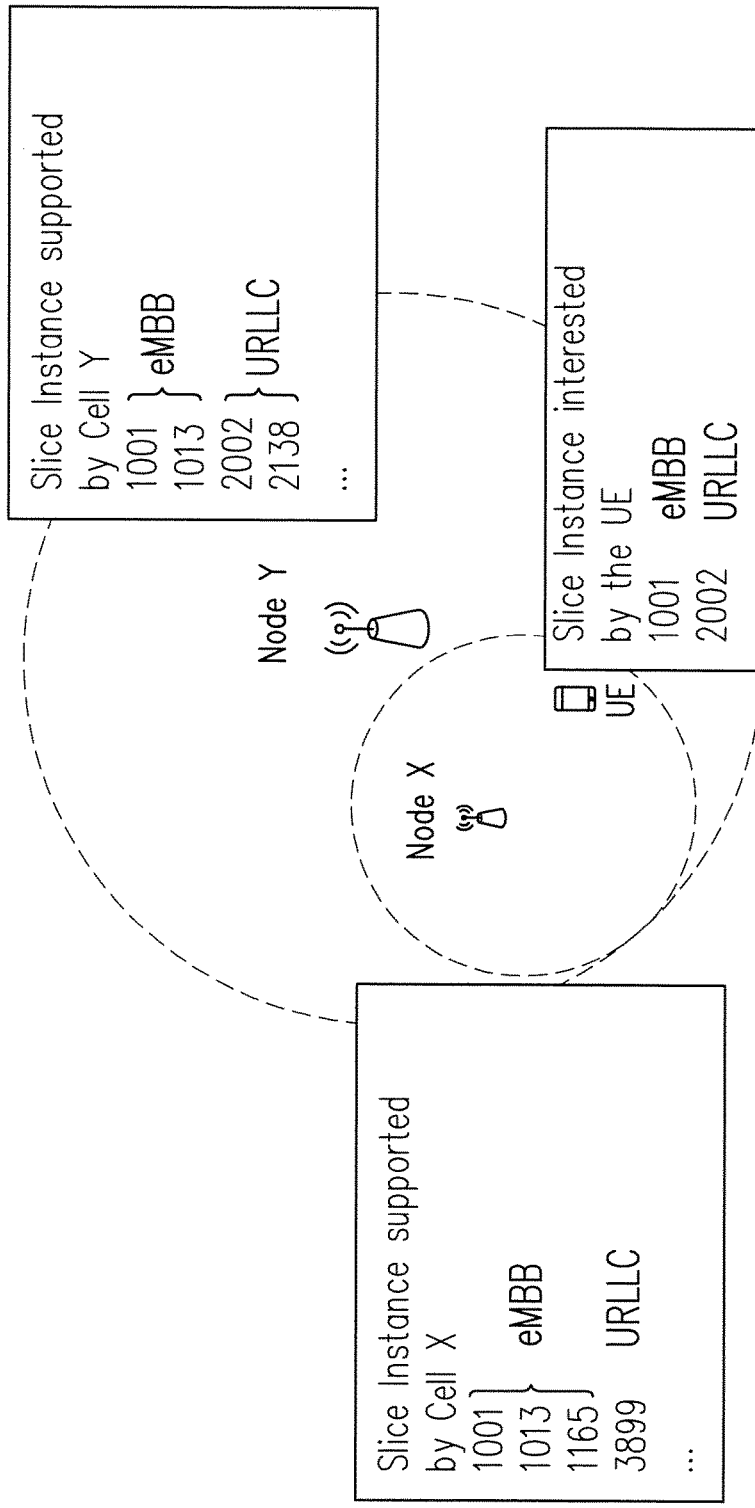

FIG. 9A and FIG. 9B are schematic diagrams illustrating cell selection procedure of the UE according to an embodiment of the application. Referring to both FIG. 9A and FIG. 9B, the UE enters signal ranges of a Node X and a Node Y, in which the slice instances supported by the Cell X in the Node X include: 1001, 1013 and 1165 for eMBB; and 3899 for URLLC while the slice instances supported by the Cell Y in the Node Y include: 1001 and 1013 for eMBB; and 2002 and 2138 for URLLC. The slice instance information provided to the UE may include:

{eMBB, URLLC, mIoT}={0.3, 0.1, 0} for the current cell X; and

{eMBB, URLLC, mIoT}={0.2, 0.2, 0} for the neighbor cell Y.

Referring to FIG. 9A, in the cell selection procedure of the UE, if the signal strengths of both Cell X and Cell Y exceed a threshold, the UE selects the Cell X to camp on if (IMSI mod (0.3+0.2))<=0.3; and the UE selects the Cell Y to camp on if (IMSI mode (0.3+0.2))>0.3, where the IMSI stands for the International Mobile Subscriber Identity. Due to different IMSI of each UE, the distribution of UE for Cell X and Cell Y may reach a balanced status.

Referring to FIG. 9B, in the cell selection procedure of the UE, if the signal strengths of both Cell X and Cell Y exceed a threshold, the UE selects the Cell X to camp on if (IMSI mod (0.03+0.04))<=0.03; and the UE selects the Cell Y to camp on if (IMSI mode (0.03+0.04))>0.03, where 0.03=0.3*0.1 and 0.04=0.2*0.2.

Based on the above, in the user equipment, the access node and the slice-based handover method thereof according to the present application, when an RSI selection is needed for a current service request, a node which not only supports the RSI for the current service, but also supports the RSI capability of UE as much as possible for the potential services is selected. Therefore, the RSI selection according to the present application may cause a slice-based redirection or handover. UE may provide RSSAI to the serving node for RSI selection, and the service-oriented measurement configuration realizes the different criteria of measurement triggering for different service requirements. If the RSI-load information may be exchanged via Xn interface, the access node may avoid commanding the UE to connect to an overloaded node although this node can support the RSI(s) to the UE. The additional handover caused by the potential services in multiple-slices scenario may be alleviated.

Although the invention has been disclosed by the above embodiments, they are not intended to limit the invention. It will be clear to one of ordinary skill in the art that modifications and variations to the invention may be made without departing from the spirit and scope of the invention. Therefore, the scope of the invention will be defined by the appended claims.

What is claimed is:

1. A slice-based handover method, comprising:
    sending a service request from a user equipment (UE) to an access node;
    selecting, a plurality of candidate slice instances by the access node or by the UE provided by a plurality of cells of the access node and a plurality of neighbor nodes that support the service request;
    measuring a plurality of measurement objects with respect to each of the candidate slice instances and sending a measurement report to the access node by the UE;
    deciding a target cell by the access node with at least one slice instance that supports the service request from the candidate slice instances according to the measurement report; and
    sending a control command to the UE to configure a connection between the UE and the target cell by the access node.

2. The method according to claim 1, wherein the service request comprises a service type, a plurality of quality of service (QoS) parameters and a slice selection information, wherein the slice selection information comprises one or a combination of a radio access network (RAN) slice instance (RSI) capability, a band capability, a frequency capability, a numerology capability, and an antenna capability of the UE.

3. The method according to claim 2, wherein the slice selection information is contained within a network slice selection assistance information (NSSAI).

4. The method according to claim 1, wherein the step of selecting the plurality of candidate slice instances provided by the cells of the access node and the plurality of neighbor nodes that support the service request further comprises:
    selecting the plurality of candidate slice instances by the access node from a plurality of slice instances provided by the cells of the access node and the plurality of neighbor nodes according to a slice instance information pre-defined or pre-configured to each of the plurality of slice instances.

5. The method according to claim 1, wherein before the step of sending the service request from the UE to the access node, the method further comprises:
    receiving a slice instance information pre-defined or pre-configured to each of a plurality of slice instances provided by the cells of the access node and the plurality of neighbor nodes from a slice instance server or from the access node by the UE; and
    selecting the plurality of candidate slice instances from the plurality of slice instances according to the received slice instance information by the UE.

6. The method according to claim 1, further comprising:
    periodically exchanging a RSI information with the neighbor nodes by the access node, wherein the RSI information comprises one or a combination of a RSI capability and a RSI load information.

7. The method according to claim 6, wherein the step of measuring the plurality of measurement objects with respect to each of the candidate slice instances and sending the measurement report to the access node by the UE further comprises:
    receiving a measurement configuration request from the access node, wherein the measurement configuration request comprises the measurement objects to be measured with respect to each of the candidate slice instances determined by the access node according to an application service type indicated in the service request to the UE, and the measurement objects comprise a frequency or a band, physical cell identifiers (PCIs), a reference signal receiving power (RSRP), or a reference signal receiving quality (RSRQ); and
    measuring the measurement objects indicated in the measurement configuration request with respect to each of the candidate slice instances to derive a cell quality and reporting the cell quality to the access node by the UE.

8. The method according to claim 7, wherein the step of deciding the target cell with the at least one slice instance that supports the service request from the candidate slice instances according to the measurement report by the access node further comprises:

establishing a target cell priority list including a plurality of target cells sorted based on a number of the slice instances of each target cell that support the UE according to the measurement report;

determining whether the slice instances in a current cell of the target cells are overloaded based on the RSI load information;

if the slice instances in the current cell are overloaded, determining whether the slice instances in a next cell in the target cell priority list are overloaded based on the RSI load information;

if the slice instances in the current cell or the next cell are not overloaded, deciding the current cell or the next cell as the target cell; and if the slices instances in all of the target cells are overloaded, deciding none of the target cells is capable of supporting the service request.

9. The method according to claim 8, wherein the step of sending the control command to the UE to configure the connection between the UE and the target cell by the access node further comprises:

transmitting an intra-node handover command to the UE to configure the connection between the UE and the target cell in the access node if the target cell is in the access node; and transmitting an inter-node handover command to the UE to configure the connection between the UE and the target cell in a corresponding neighbor node, if the target cell is not in the access node and the UE is in an active mode;

transmitting a release message with redirection information of the target cell to the UE to configure the connection between the UE and the target cell in the corresponding neighbor node, if the target cell is not in the access node and the UE is in an inactive mode or an idle mode; and transmitting a rejection message to the UE to reject the service request by the access node if none of the target cells is capable of supporting the service request.

10. The method according to claim 1, wherein the step of measuring the plurality of measurement objects with respect to each of the candidate slice instances and sending the measurement report to the access node by the UE further comprises:

receiving a measurement configuration request from the access node, wherein the measurement configuration request comprises the measurement objects to be measured with respect to each of the candidate slice instances determined by the access node according to an application service type indicated in the service request to the UE, and the measurement objects comprise a frequency or a band, a reference signal receiving power (RSRP), or a reference signal receiving quality (RSRQ); and measuring the measurement objects indicated in the measurement configuration request with respect to each of the candidate slice instances to derive a cell quality and reporting the cell quality to the access node by the UE.

11. The method according to claim 1, wherein the step of measuring the plurality of measurement objects with respect to each of the candidate slice instances and sending the measurement report to the access node by the UE further comprises:

deriving a cell reliability from the measurement objects with respect to each of the candidate slice instances and reporting the cell reliability to the access node by the UE, wherein the measurement objects comprise an error rate, an access delay, or a scheduling delay.

12. The method according to claim 1, wherein the step of deciding the target cell with the at least one slice instance that supports the service request from the candidate slice instances according to the measurement report further comprises:

issuing a handover request to the neighbor node having the target cell to pass handover information to the neighbor node by the access node; and receiving a handover request acknowledge message from the neighbor node to confirm the handover request.

13. A slice-based handover method, adapted to an access node, comprising:

receiving a service request from a user equipment (UE);

selecting a plurality of candidate slice instances provided by a plurality of cells of the access node and a plurality of neighbor nodes that support the service request;

transmitting a measurement configuration request comprising a plurality of measurement objects to be measured with respect to each of the candidate slice instances determined according to an application service type indicated in the service request to the UE;

receiving a measurement report from the UE, wherein the measurement report is generated by the UE measuring the plurality of measurement objects with respect to each of the candidate slice instances;

deciding a target cell with at least one slice instance that supports the service request from the candidate slice instances according to the measurement report; and sending a control command to the UE to configure a connection between the UE and the target cell.

14. The method according to claim 13, wherein the service request comprises a service type, a plurality of QoS parameters and a slice selection information, wherein the slice selection information comprises one or a combination of a RSI capability, a band capability, a frequency capability, a numerology capability, and an antenna capability of the UE.

15. The method according to claim 14, wherein the slice selection information is contained within a NSSAI.

16. The method according to claim 13, wherein the step of selecting the plurality of candidate slice instances provided by the cells of the access node and the plurality of neighbor nodes that support the service request further comprises:

selecting the plurality of candidate slice instances from a plurality of slice instances provided by the cells of the access node and the plurality of neighbor nodes according to a slice instance information pre-defined or pre-configured to each of the plurality of slice instances.

17. The method according to claim 13, further comprising:

periodically exchanging a RSI information with the neighbor nodes, wherein the RSI information comprises one or a combination of a RSI capability and a RSI load information.

18. The method according to claim 17, wherein the step of deciding the target cell with the at least one slice instance that supports the service request from the candidate slice instances according to the measurement report further comprises:

establishing a target cell priority list including a plurality of target cells sorted based on a number of the slice instances of each target cell that support the UE according to the measurement report;
determining whether the slice instances in a current cell of the target cells are overloaded based on the RSI load information;
if the slice instances in the current cell are overloaded, determining whether the slice instances in a next cell in the target cell priority list are overloaded based on the RSI load information;
if the slice instances in the current cell or the next cell are not overloaded, deciding the current cell or the next cell as the target cell; and
if the slices instances in all of the target cells are overloaded, deciding none of the target cells is capable of supporting the service request.

19. The method according to claim 18, wherein the step of sending the control command to the UE to configure the connection between the UE and the target cell further comprises:
transmitting an intra-node handover command to the UE to configure the connection between the UE and the target cell in the access node, if the target cell is in the access node;
transmitting an inter-node handover command to the UE to configure the connection between the UE and the target cell in a corresponding neighbor node, if the target cell is not in the access node and the target cell is in an active mode;
transmitting a release message with redirection information of the target cell to the UE to configure the connection between the UE and the target cell in the corresponding neighbor node, if the target cell is not in the access node and the target cell is in an inactive mode or an idle mode; and
transmitting a rejection message to the UE to reject the service request if none of the target cells is capable of supporting the service request.

20. The method according to claim 13, wherein the step of deciding the target cell with the at least one slice instance that supports the service request from the candidate slice instances according to the measurement report further comprises:
issuing a handover request to the neighbor node having the target cell to pass handover information to the neighbor node; and
receiving a handover request acknowledge message from the neighbor node to confirm the handover request.

21. An access node, comprising:
a plurality of cells, each providing at least one slice instance;
a communication interface, communicating with a plurality of neighbor nodes; and
a processor, coupled to the cells and the communication interface and configured to execute instructions to:
receive a service request from a user equipment (UE);
select a plurality of candidate slice instances from the slice instances provided by the plurality of cells of the access node and the plurality of neighbor nodes that support the service request;
transmit a measurement configuration request comprising a plurality of measurement objects to be measured with respect to each of the candidate slice instances determined according to an application service type indicated in the service request to the UE;
receive a measurement report from the UE, wherein the measurement report is generated by the UE measuring the plurality of measurement objects with respect to each of the candidate slice instances;
decide a target cell with at least one slice instance that supports the service request from the candidate slice instances according to the measurement report; and
send a control command to the UE to configure a connection between the UE and the target cell.

22. The access node according to claim 21, wherein the service request comprises a service type, a plurality of QoS parameters and a slice selection information, wherein the slice selection information comprises one or a combination of a RSI capability, a band capability, a frequency capability, a numerology capability, and an antenna capability of the UE.

23. The access node according to claim 22, wherein the slice selection information is contained within a NSSAI.

24. The access node according to claim 21, wherein the processor further selects the plurality of candidate slice instances from a plurality of slice instances provided by the cells of the access node and the plurality of neighbor nodes according to a slice instance information pre-defined or pre-configured to each of the plurality of slice instances.

25. The access node according to claim 21, wherein the processor further periodically exchanges a RSI information with the neighbor nodes, wherein the RSI information comprises one or a combination of a RSI capability and a RSI load information.

26. The access node according to claim 25, wherein the processor further establishes a target cell priority list including a plurality of target cells sorted based on a number of the slice instances of each target cell that support the UE according to the measurement report, and determines whether the slice instances in a current cell of the target cells are overloaded based on the RSI load information, wherein
if the slice instances in the current cell are overloaded, the processor determines whether the slice instances in a next cell in the target cell priority list are overloaded based on the RSI load information;
if the slice instances in the current cell or the next cell are not overloaded, the processor decides the current cell or the next cell as the target cell; and
if the slices instances in all of the target cells are overloaded, the processor decides none of the target cells is capable of supporting the service request.

27. The access node according to claim 26, wherein
if the target cell is in the access node, the processor transmits an intra-node handover command to the UE to configure the connection between the UE and the target cell in the access node;
if the target cell is not in the access node and the target cell is in an active mode, the processor transmits an inter-node handover command to the UE to configure the connection between the UE and the target cell in a corresponding neighbor node;
if the target cell is not in the access node and the target cell is in an inactive mode or an idle mode, the processor transmits a release message with redirection information of the target cell to the UE to configure the connection between the UE and the target cell in the corresponding neighbor node; and
if none of the target cells is capable of supporting the service request, the processor transmits a rejection message to the UE to reject the service request.

28. The access node according to claim 21, wherein the processor further issues a handover request to the neighbor node having the target cell to pass handover information to the neighbor node, and receives a handover request acknowledge message from the neighbor node to confirm the handover request.

29. A slice-based handover method, adapted to a user equipment (UE), comprising:
    sending a service request to an access node;
    receiving a measurement configuration request comprising a plurality of measurement objects to be measured with respect to each of a plurality of candidate slice instances determined according to an application service type indicated in the service request;
    measuring a plurality of measurement objects with respect to each of the candidate slice instances and sending a measurement report to the access node; and
    receiving a control command from the access node to configure a connection between the UE and a target cell decided by the access node from the candidate slice instances according to the measurement report, wherein the target cell comprises at least one slice instance that supports the service request.

30. The method according to claim 29, wherein the service request comprises a service type, a plurality of QoS parameters and a slice selection information, wherein the slice selection information comprises one or a combination of a RSI capability, a band capability, a frequency capability, a numerology capability, and an antenna capability of the UE.

31. The method according to claim 30, wherein the slice selection information is contained within a NSSAI.

32. The method according to claim 29, wherein the method further comprises:
    receiving a slice instance information pre-defined or pre-configured to each of a plurality of slice instances provided by a plurality of cells of the access node and a plurality of neighbor nodes from a slice instance server or from the access node; and
    selecting the plurality of candidate slice instances from the plurality of slice instances according to the received slice instance information.

33. The method according to claim 29, wherein the step of measuring the plurality of measurement objects with respect to each of the candidate slice instances and sending the measurement report to the access node further comprises:
    receiving a measurement configuration request from the access node, wherein the measurement configuration request comprises the measurement objects to be measured with respect to each of the candidate slice instances determined by the access node according to an application service type indicated in the service request to the UE, and the measurement objects comprise a frequency or a band, PCIs, a RSRP, or a RSRQ; and
    measuring the measurement objects indicated in the measurement configuration request with respect to each of the candidate slice instances to derive a cell quality and reporting the cell quality to the access node.

34. The method according to claim 29, wherein the step of measuring the plurality of measurement objects with respect to each of the candidate slice instances and sending the measurement report to the access node further comprises:
    deriving a cell reliability from the measurement objects with respect to each of the candidate slice instances and reporting the cell reliability to the access node, wherein the measurement objects comprise an error rate, an access delay, or a scheduling delay.

35. A user equipment, comprising:
    a transceiver, configured to transmit wireless signals to and receive wireless signals from a plurality of cells disposed in an access node; and
    a processor, coupled to the transceiver and configured to execute instructions to:
    send a service request to the access node;
    receive a measurement configuration request comprising a plurality of measurement objects to be measured with respect to each of a plurality of candidate slice instances determined according to an application service type indicated in the service request;
    measure a plurality of measurement objects with respect to each of the candidate slice instances and send a measurement report to the access node; and
    receive a control command from the access node to configure a connection between the UE and a target cell decided by the access node from the candidate slice instances according to the measurement report, wherein the target cell comprises at least one slice instance that supports the service request.

36. The user equipment according to claim 35, wherein the service request comprises a service type, a plurality of QoS parameters and a slice selection information, wherein the slice selection information comprises one or a combination of a RSI capability, a band capability, a frequency capability, a numerology capability, and an antenna capability of the UE.

37. The user equipment according to claim 36, wherein the slice selection information is contained within a NSSAI.

38. The user equipment according to claim 35, wherein the processor further receives a slice instance information pre-defined or pre-configured to each of a plurality of slice instances provided by a plurality of cells of the access node and a plurality of neighbor nodes from a slice instance server or from the access node, and selects the plurality of candidate slice instances from the plurality of slice instances according to the received slice instance information.

39. The user equipment according to claim 35, wherein the processor further receives a measurement configuration request from the access node, measures the measurement objects indicated in the measurement configuration request with respect to each of the candidate slice instances to derive a cell quality, and reports the cell quality to the access node, wherein the measurement configuration request comprises the measurement objects to be measured with respect to each of the candidate slice instances determined by the access node according to an application service type indicated in the service request to the UE, and the measurement objects comprise a frequency or a band, PCIs, a RSRP, or a RSRQ.

40. The user equipment according to claim 35, wherein the processor further derives a cell reliability from the measurement objects with respect to each of the candidate slice instances and reports the cell reliability to the access node, wherein the measurement objects comprise an error rate, an access delay, or a scheduling delay.

* * * * *